(12) United States Patent
Jin

(10) Patent No.: US 12,174,323 B2
(45) Date of Patent: Dec. 24, 2024

(54) MULTI-FUNCTION TIME-OF-FLIGHT SENSOR AND METHOD OF OPERATING THE SAME

(71) Applicant: SAMSUNG ELECTRONICS CO., LTD., Suwon-si (KR)

(72) Inventor: Younggu Jin, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1031 days.

(21) Appl. No.: 17/139,594

(22) Filed: Dec. 31, 2020

(65) Prior Publication Data
US 2022/0018946 A1 Jan. 20, 2022

(30) Foreign Application Priority Data
Jul. 17, 2020 (KR) .......................... 10-2020-0088776

(51) Int. Cl.
*G01C 3/08* (2006.01)
*G01S 7/4915* (2020.01)
*G01S 17/894* (2020.01)

(52) U.S. Cl.
CPC .......... *G01S 7/4915* (2013.01); *G01S 17/894* (2020.01)

(58) Field of Classification Search
CPC .............................. G01S 7/4915; G01S 17/894
See application file for complete search history.

(56) References Cited

U.S. PATENT DOCUMENTS

| 9,055,242 B2 | 6/2015 | Kim et al. |
| 10,580,807 B2 | 3/2020 | Morestin et al. |
| 2014/0346361 A1* | 11/2014 | Wang ..................... G06F 1/1684 250/349 |
| 2019/0208150 A1 | 7/2019 | Jin et al. |
| 2019/0281241 A1 | 9/2019 | Jin et al. |
| 2020/0027909 A1 | 1/2020 | Ebiko et al. |
| 2020/0029047 A1 | 1/2020 | Jin et al. |
| 2020/0264311 A1* | 8/2020 | Le Dortz ................ G01S 17/36 |

FOREIGN PATENT DOCUMENTS

WO    WO 2015104307 A1 *  7/2015  ........... G01S 7/4914

* cited by examiner

*Primary Examiner* — Mark Hellner
(74) *Attorney, Agent, or Firm* — Sughrue Mion, PLLC

(57) ABSTRACT

A method of operating a time-of-flight (ToF) sensor including at least one depth pixel having a multi-tap structure and a light source illuminating a transmission light to an object is provided. An operation mode of a ToF sensor is determined among a distance detection mode to sense a distance to an object and a plurality of additional operation modes. A plurality of taps of a depth pixel and a light source are controlled based on the determined operation mode such that the plurality of taps generate a plurality of sample data corresponding to the determined operation mode. A sensing result corresponding to the selected operation mode is determined based on the plurality of sample data. A plurality of functions, in addition to a function of the ToF sensor to measure a distance to an object, may be performed efficiently by controlling the plurality of taps of the depth pixel and the light source depending on the operation modes.

20 Claims, 27 Drawing Sheets

MULTI-FUNCTION TIME-OF-FLIGHT SENSOR AND METHOD OF OPERATING THE SAME

CROSS-REFERENCE TO RELATED APPLICATION

This application claims priority under 35 USC § 119 from Korean Patent Application No. 10-2020-0088776, filed on Jul. 17, 2020, in the Korean Intellectual Property Office (KIPO), the disclosure of which is incorporated by reference herein in its entirety.

BACKGROUND

1. Technical Field

Example embodiments relate generally to semiconductor integrated circuits, and more particularly to a multi-function time-of-flight (ToF) sensor and a method of operating a ToF sensor.

2. Discussion of the Related Art

Recently, interest in sensing technologies for acquiring three-dimensional information of an object is increasing and various three-dimensional cameras have been developed. Among the three-dimensional cameras, a ToF (Time-of-Flight) sensor has a simple circuit configuration and high distance resolution. The ToF sensor illuminates an object with a transmission light using a light source, and calculates a distance to the object by measuring a phase difference of a flight time of a reception light reflected from the object using demodulation signals. Various electronic devices, including mobile phones, may include sensors having different functions, in addition to the ToF sensor, thereby increasing the sizes of the electronic devices.

SUMMARY

Some example embodiments may provide a time-of-flight (ToF) sensor capable of various functions, and a method of operating the ToF sensor to implement various functions.

According to an aspect of an example embodiment, a method of operating a time-of-flight (ToF) sensor including at least one depth pixel having a multi-tap structure and a light source illuminating a transmission light to an object, includes, determining an operation mode of a ToF sensor, from among a distance detection mode to sense a distance to an object and a plurality of additional operation modes, controlling a plurality of taps of a depth pixel and a light source based on the determined operation mode such that the plurality of taps generate a plurality of sample data corresponding to the determined operation mode, and determining a sensing result corresponding to the determined operation mode based on the plurality of sample data.

According to an aspect of another example embodiment, a time-of-flight sensor includes a light source configured to illuminate a transmission light to an object, a pixel array comprising at least one depth pixel having a multi-tap structure, a row scanning circuit configured to generate a plurality of sampling control signals applied to a plurality of taps of the depth pixel, and a controller configured to control the light source, the pixel array and the row scanning circuit based on a mode signal indicating a selected operation mode of a ToF sensor among a distance detection mode to sense a distance to an object and a plurality of additional operation modes such that the plurality of taps generate a plurality of sample data corresponding to the selected operation mode.

According to an aspect of another example embodiment, a method of operating a time-of-flight (ToF) sensor including at least one depth pixel having a multi-tap structure and a light source illuminating a transmission light to an object, includes, determining an operation mode of a ToF sensor, from among a distance detection mode to sense a distance to an object and a plurality of additional operation modes, based on the determined operation mode being the distance detection mode, applying a plurality of sampling control signals of different phases to a plurality of taps of a depth pixel during an integration period to collect a photo charge generated by an incident light, and based on the determined operation mode being one of the plurality of additional operation modes, dividing the integration period into a plurality of shot periods and selectively activating the transmission light and the plurality of sampling control signals during the plurality of shot periods based on the selected operation mode.

According to an aspect of another example embodiment, an apparatus for operating a time-of-flight sensor includes a memory storing instructions, and at least one processor configured to execute the instructions to determine an operation mode of a ToF sensor, from among a distance detection mode to sense a distance to an object and a plurality of additional operation modes, based on the determined operation mode being the distance detection mode, control to apply a plurality of sampling control signals of different phases to a plurality of taps of a depth pixel during an integration period to collect a photo charge generated by an incident light, and based on the determined operation mode being one of the plurality of additional operation modes, divide the integration period into a plurality of shot periods and control to selectively activate the transmission light and the plurality of sampling control signals during the plurality of shot periods based on the determined operation mode.

According to an aspect of another example embodiment, a non-transitory computer-readable recording medium has recorded thereon instructions executable by at least one processor to perform a method of operating a ToF sensor, the method including determining an operation mode of a ToF sensor, from among a distance detection mode to sense a distance to an object and a plurality of additional operation modes, based on the determined operation mode being the distance detection mode, applying a plurality of sampling control signals of different phases to a plurality of taps of a depth pixel during an integration period to collect a photo charge generated by an incident light, and based on the determined operation mode being one of the plurality of additional operation modes, dividing the integration period into a plurality of shot periods and selectively activating the transmission light and the plurality of sampling control signals during the plurality of shot periods based on the determined operation mode.

The ToF sensor and the method of operating the ToF sensor according to example embodiments may perform a plurality of functions, in addition to an original function of the ToF sensor to measure a distance, by controlling the plurality of taps of the depth pixel and the light source depending on the operation modes.

BRIEF DESCRIPTION OF THE DRAWINGS

Example embodiments of the present disclosure will be more clearly understood from the following detailed description taken in conjunction with the accompanying drawings, in which.

DETAILED DESCRIPTION

Figure 1:
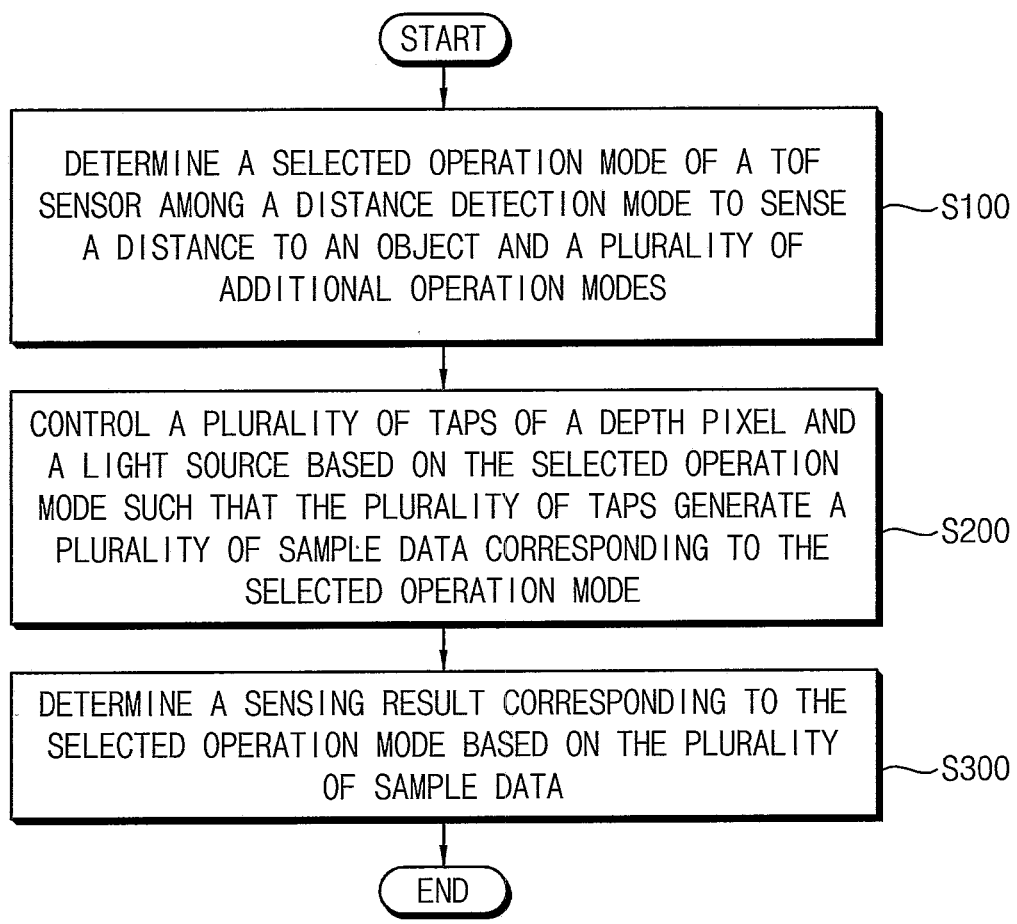
FIG. 1 is a flowchart illustrating a method of operating a time-of-flight (ToF) sensor according to an example embodiment.

Various example embodiments will be described more fully hereinafter with reference to the accompanying drawings, in which some example embodiments are shown. In the drawings, like numerals refer to like elements throughout. The repeated descriptions may be omitted. Hereinafter, it is understood that expressions such as "at least one of," when preceding a list of elements, modify the entire list of elements and do not modify the individual elements of the list. For example, the expressions "at least one of [A], [B], and [C]" or "at least one of [A], [B], or [C]" means only A, only B, only C, A and B, B and C, A and C, or A, B, and C.

FIG. 1 is a flowchart illustrating a method of operating a time-of-flight (ToF) sensor according to an example embodiment.

Referring to FIG. 1, to operate a time-of-flight (ToF) sensor including at least one depth pixel having a multi-tap structure and a light source illuminating a transmission light to an object, a selected operation mode of a ToF sensor is determined among a distance detection mode to sense a distance to an object and a plurality of additional operation modes (S100) (or at least one additional operation mode). The depth pixel, the ToF sensor and the distance detection mode, which may correspond to the original function of the ToF sensor, are described below with reference to FIGS. 2 through 6.

According to example embodiments, the plurality of additional operation modes may include at least one of an object detection mode to sense existence of the object, a motion detection mode to sense a motion of the object, a combination detection mode to simultaneously sense the existence of the object and the motion of the object, and a wide dynamic range (WDR) mode to sense the object with a plurality of sensing sensitivities. The plurality of additional operation modes according to example embodiments are described below with reference to FIGS. 7 through 21.

A plurality of taps of a depth pixel and a light source are controlled based on the selected operation mode such that the plurality of taps generate a plurality of sample data corresponding to the selected operation mode (S200).

In the distance detection mode, during an integration period to collect a photo charge generated by an incident light, the transmission light may be generated using the light source and the distance may be measured using a plurality of sampling control signals of different phases. In contrast, in at least one (or all) of the plurality of additional operation modes, the integration period may be divided into a plurality of shot periods, and the plurality of sampling control signals may be selectively activated during the plurality of shot periods based on the selected operation mode.

A sensing result corresponding to the selected operation mode is determined based on the plurality of sample data (S300). The plurality of sample data may include different information depending on the operation modes. A method of determining the sensing result according to example embodiments is described below with reference to FIGS. 7 through 21.

As such, the ToF sensor and the method of operating the ToF sensor according to an example embodiment may perform a plurality of functions, in addition to a function of the ToF sensor to measure a distance, by controlling the plurality of taps of the depth pixel and the light source depending on the operation modes.

Hereinafter, configuration and operation of the ToF sensor are described with reference to FIGS. 2 through 6, and additional functions using the ToF sensor are described below with reference to FIGS. 7 through 21.

Figure 2:
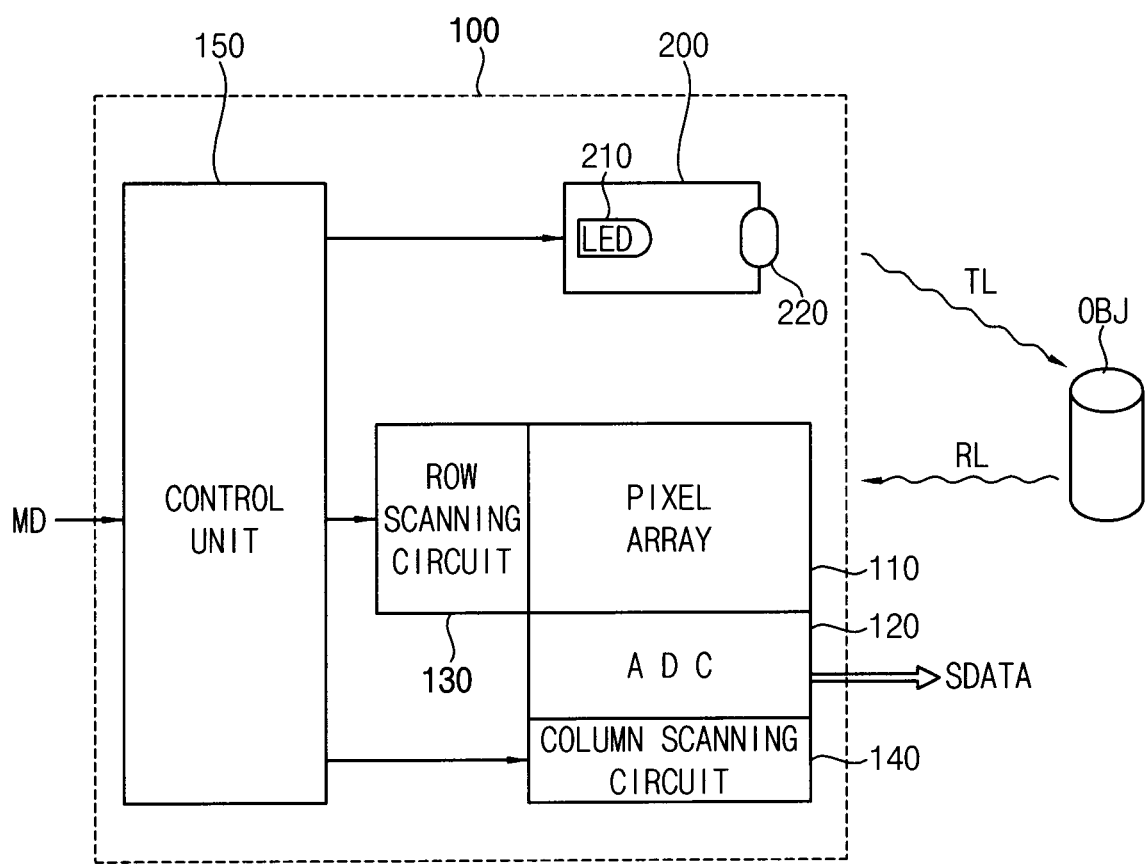
FIG. 2 is a block diagram illustrating a ToF sensor according to an example embodiment.

FIG. 2 is a block diagram illustrating a ToF sensor 100 according to an example embodiment.

Referring to FIG. 2, a ToF sensor 100 includes a sensing unit (e.g., sensor), a controller 150 and a light source module 200 (e.g., light source). The sensing unit may include a pixel array 110, an analog-to-digital converter (ADC) unit 120 (or ADC), a row scanning circuit 130, and a column scanning circuit 140.

The pixel array 110 may include depth pixels receiving light RL that is reflected from an object OBJ after being transmitted to the object OBJ by the light source module 200. The depth pixels may convert the reception light RL into electrical signals. The depth pixels may provide information about a distance of the object OBJ from the ToF sensor 100 and/or black-and-white image information.

The pixel array 110 may further include color pixels for providing color image information. In this case, the ToF sensor 100 may be a three-dimensional color image sensor that provides the color image information and the depth information. According to example embodiments, an infrared filter and/or a near-infrared filter may be formed on the depth pixels, and a color filter (e.g., red, green and blue filters) may be formed on the color pixels. According to example embodiments, a ratio of the number of the depth pixels to the number of the color pixels may vary as desired or by design.

The ADC unit 120 may convert an analog signal output from the pixel array 110 into a digital signal. According to example embodiments, the ADC unit 120 may perform a column analog-to-digital conversion that converts analog signals in parallel using a plurality of analog-to-digital converters respectively coupled to a plurality of column lines. According to example embodiments, the ADC unit 120 may perform a single analog-to-digital conversion that sequentially converts the analog signals using a single analog-to-digital converter.

According to example embodiments, the ADC unit 120 may further include a correlated double sampling (CDS) unit for extracting an effective signal component. The CDS unit may perform an analog double sampling that extracts the effective signal component based on a difference between an analog reset signal including a reset component and an analog data signal including a signal component. Further, the CDS unit may perform a digital double sampling that converts the analog reset signal and the analog data signal into two digital signals and extracts the effective signal component based on a difference between the two digital signals. Additionally, the CDS unit may perform a dual correlated double sampling that performs both the analog double sampling and the digital double sampling.

The row scanning circuit 130 may receive control signals from the controller 150, and may control a row address and a row scan of the pixel array 110. To select a row line among a plurality of row lines, the row scanning circuit 130 may apply a signal for activating the selected row line to the pixel array 110. According to example embodiments, the row scanning circuit 130 may include a row decoder that selects a row line of the pixel array 110 and a row driver that applies a signal for activating the selected row line.

The column scanning circuit 140 may receive control signals from the controller 150, and may control a column address and a column scan of the pixel array 110. The column scanning circuit 140 may output a digital output signal from the ADC unit 120 to a digital signal processing circuit (not shown) and/or to an external host (not shown). For example, the column scanning circuit 140 may provide the ADC unit 120 with a horizontal scan control signal to sequentially select a plurality of analog-to-digital converters included in the ADC unit 120.

The controller 150 may control the ADC unit 120, the row scanning circuit 130, the column scanning circuit 140, and the light source module 200. The controller 150 may provide the ADC unit 120, the row scanning circuit 130, the column scanning circuit 140, and the light source module 200 with control signals, such as at least one of a clock signal, a timing control signal, or the like. The controller 150 may include at least one of a control logic circuit, a phase locked loop circuit, a timing control circuit, a communication interface circuit, or the like.

The light source module 200 may emit light of a desired (or, alternatively, a predetermined) wavelength. For example, the light source module 200 may emit infrared light and/or near-infrared light. The light source module 200 may include a light source 210 and a lens 220. The light source 210 may be controlled by the controller 150 to emit the transmission light TL of a desired intensity and/or characteristic (for example, periodic). For example, the intensity and/or characteristic of the transmission light TL may be controlled such that the transmission light TL has a waveform of a pulse wave, a sine wave, a cosine wave, or the like. The light source 210 may be implemented by a light emitting diode (LED), a laser diode, or the like.

Hereinafter, a first operation (e.g., normal operation) of the ToF sensor 100 according to example embodiments is described below.

The controller 150 may control the light source module 200 to emit the transmission light TL having the periodic intensity. The transmission light TL emitted by the light source module 200 may be reflected from the object OBJ back to the ToF sensor 100 as the reception light RL. The reception light RL may be incident on the depth pixels, and the depth pixels may be activated by the row scanning circuit 130 to output analog signals corresponding to the reception light RL. The ADC unit 120 may convert the analog signals output from the depth pixels into sample data SDATA. The sample data SDATA may be provided to the controller 150 by the column scanning circuit 140 and/or the ADC 120.

The controller 150 may calculate a distance of the object OBJ from the ToF sensor 100, a horizontal position of the object OBJ, a vertical position of the object OBJ and/or a size of the object OBJ based on the sample data SDATA. The controller 150 may control the emission angle or a projection (or incident) region of the transmission light TL based on the distance, the horizontal position, the vertical position and/or the size of the object OBJ. For example, the controller 150 may control an interval between the light source 210 and the lens 220, a relative position (or a placement) of the light source 210 and the lens 220 with respect to each other, a refractive index of the lens 220, a curvature of the lens 220, or the like.

The transmission light TL illuminated to the object OBJ may be reflected and the reflection light RL may be incident on the depth pixels in the pixel array 110. The depth pixels may output analog signals corresponding to the reflection light RL, the ADC unit 120 may convert the analog signals to digital data or the sample data SDATA. The sample data SDATA and/or the depth information may be provided to the controller 150, the digital signal processing circuit and/or the external host. According to example embodiments, the pixel array 110 may include color pixels, and color image information as well as the depth information may be provided to the digital signal processing circuit and/or the external host.

The external host or processor may determine the selected operation mode of the ToF sensor 100 according to various scenarios, and provide a mode signal MD indicating the selected operation mode to the ToF sensor 100. Based on the mode signal MD, the controller 150 of the ToF sensor 100 may control the light source 210, the pixel array 110 and the row scanning circuit 130 to perform an operation corresponding to the selected operation mode.

In some example embodiments, the controller 150 or the external host may change the selected operation mode based on the sensing result of the present selected operation mode. For example, the ToF sensor 100 may operate in one of the additional operation modes and, if necessary, desired, or controlled, the selected operation mode may be converted to the distance detection mode. In some example embodiments, the selected operation mode may be changed step-by-step, for example, from the object detection mode to the motion detection mode, and from the motion detection mode to the distance detection mode.

Figure 3:
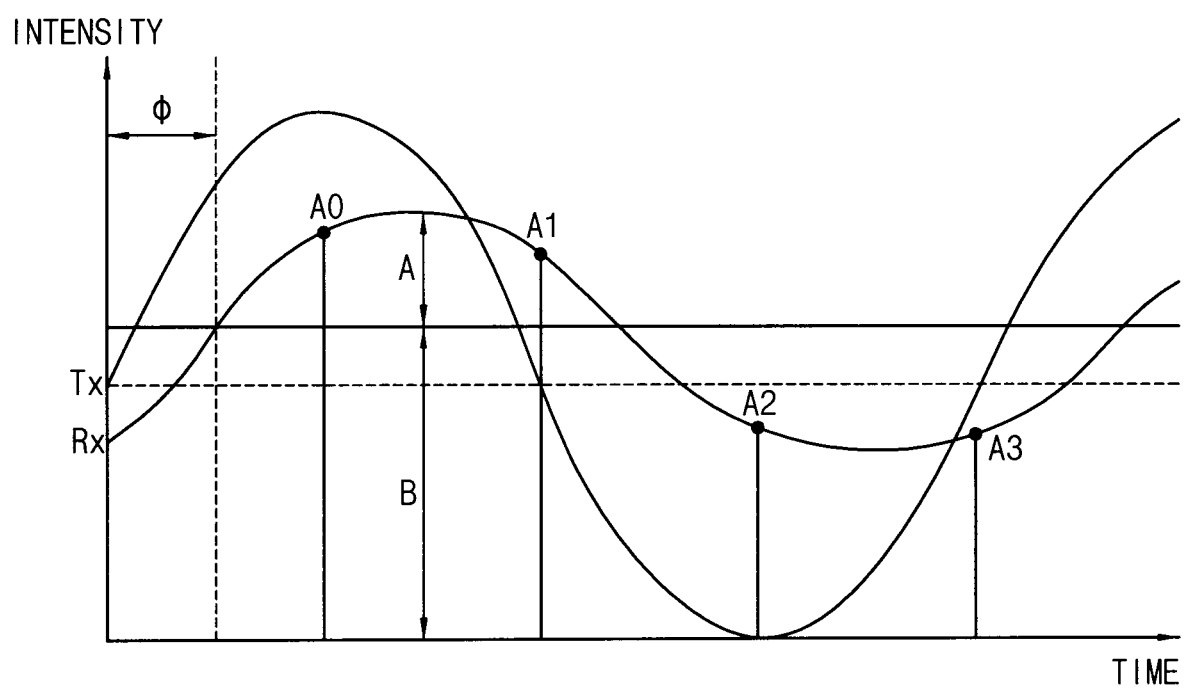
FIGS. 3 and 4 are diagrams for describing an example method of measuring and calculating a distance to an object.
Figure 4:
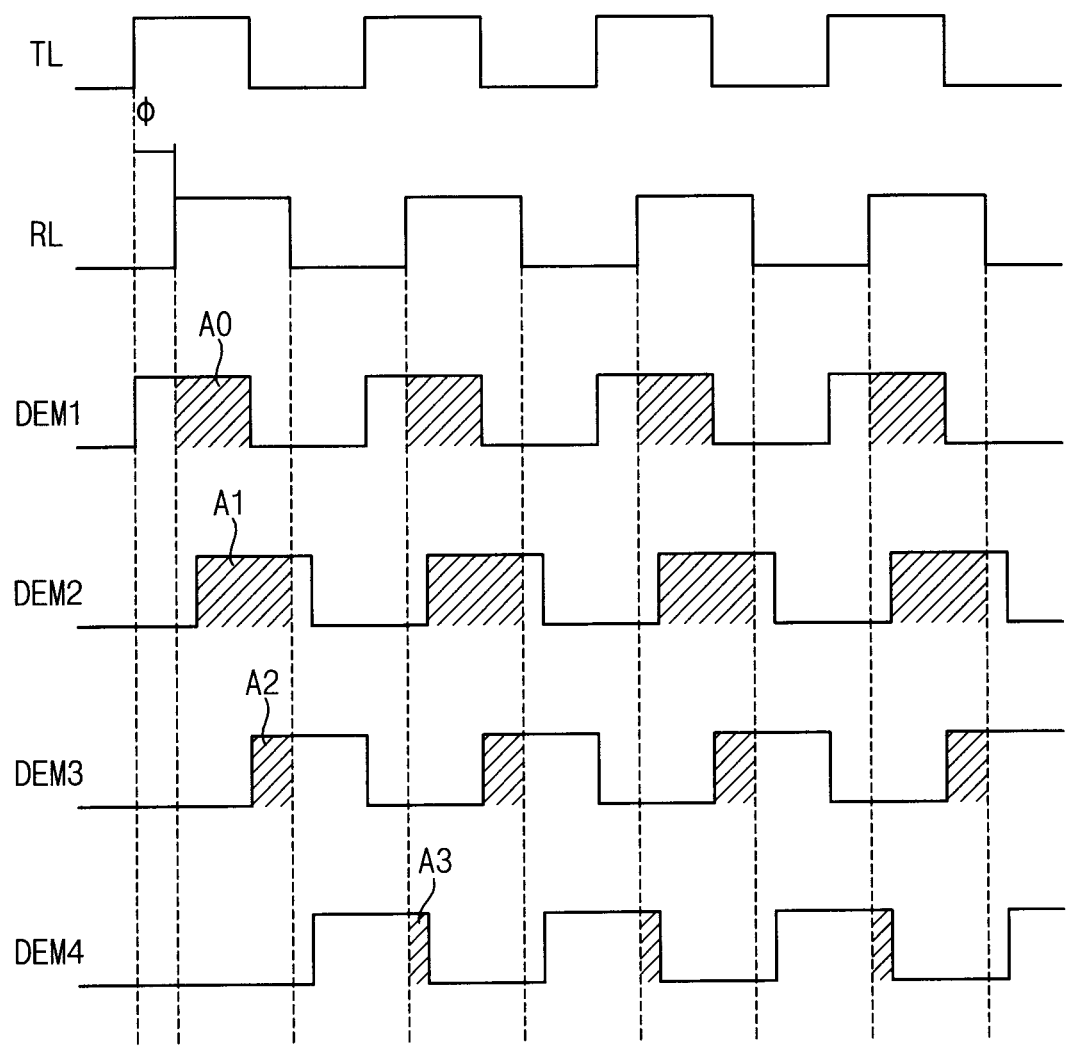

FIGS. 3 and 4 are diagrams for describing an example method of measuring and calculating a distance to an object.

Referring to FIGS. 2 and 3, the transmission light TL emitted by a light source module 200 may have a periodic intensity and/or characteristic. For example, the intensity (i.e., the number of photons per unit area) of the transmission light TL may have a waveform of a sine wave.

The transmission light TL emitted by the light source module 200 may be reflected from the object OBJ, and then may be incident on the pixel array 110 as reception light RL. The pixel array 110 may periodically sample the reception light RL. According to example embodiments, during each period of the reception light RL (for example, corresponding to a period of the transmitted light TL), the pixel array 110 may perform a sampling on the reception light RL by sampling, for example, at two sampling points having a phase difference of about 180 degrees, at four sampling points having a phase difference of about 90 degrees, or at more than four sampling points. For example, the pixel array 110 may extract four samples A0, A1, A2 and A3 of the reception light RL at phases of 90 degrees (or about 90 degrees), 180 degrees (or about 180 degrees), 270 degrees (or about 270 degrees) and 360 degrees (or about 360 degrees) per period, respectively.

The reception light RL may have an offset B that is different from an offset of the transmission light TL emitted by the light source module 200 due to background light, a noise, or the like. The offset B of the reception light RL may be calculated by Equation 1.

$$B = \frac{A0 + A1 + A2 + A3}{4} \quad \text{[Equation 1]}$$

Here, A0 represents an intensity of the reception light RL sampled at a phase of about 90 degrees of the emitted light TL, A1 represents an intensity of the reception light RL sampled at a phase of about 180 degrees of the emitted light TL, A2 represents an intensity of the reception light RL sampled at a phase of about 270 degrees of the emitted light TL, and A3 represents an intensity of the reception light RL sampled at a phase of about 360 degrees of the emitted light TL.

The reception light RL may have an amplitude A lower than that of the transmission light TL emitted by the light source module 200 due to loss (for example, light loss). The amplitude A of the reception light RL may be calculated by Equation 2.

$$A = \frac{\sqrt{(A0 - A2)^2 + (A1 - A3)^2}}{2} \quad \text{[Equation 2]}$$

Black-and-white image information about the object OBJ may be provided by respective depth pixels included in the pixel array 110 based on the amplitude A of the reception light RL.

The reception light RL may be delayed by a phase difference Φ corresponding, for example, to twice the distance of the object OBJ from the t ToF sensor 100 with respect to the emitted light TL. The phase difference Φ between the emitted light TL and the reception light RL may be calculated by Equation 3.

$$\phi = \arctan\left(\frac{A0 - A2}{A1 - A3}\right) \quad \text{[Equation 3]}$$

The phase difference Φ between the emitted light TL and the reception light RL may, for example, correspond to a time-of-flight (TF). The distance of the object OBJ from the ToF sensor 100 may be calculated by an equation, "R=c*TF/2", where R represents the distance of the object OBJ, and c represents the speed of light. Further, the distance of the object OBJ from the ToF sensor 100 may also be calculated by Equation 4 using the phase difference Φ between the emitted light TL and the reception light RL.

$$R = \frac{c}{4\pi f}\phi \quad \text{[Equation 4]}$$

Here, f represents a modulation frequency, which is a frequency of the intensity of the emitted light TL (or a frequency of the intensity of the reception light RL).

As described above, the ToF sensor 100 according to example embodiments may obtain depth information about the object OBJ using the transmission light TL emitted by the light source module 200. Although FIG. 3 illustrates the transmission light TL of which the intensity has a waveform of a sine wave, it is understood that one or more other embodiments are not limited thereto. For example, the ToF sensor 100 may use the transmission light TL of which the intensity has various types of waveforms, according to example embodiments. Further, the ToF sensor 100 may extract the depth information according to the waveform of the intensity of the transmission light TL, a structure of a depth pixel, or the like.

FIG. 4 illustrates an example of modulation timing and demodulation timings of a depth pixel having a four-tap structure, whereby the operation of the ToF sensor may vary.

Referring to FIG. 4, the transmission light TL from the light source 210 may be output in synchronization with a signal provided from the controller 150. The first through fourth demodulation signals DEM1 through DEM4 may be generated in synchronization with the signal from the controller 150. The first through fourth demodulation signals DEM1 through DEM4 have phase differences of 0, 90, 180 and 270 degrees, respectively. As described above with reference to FIG. 3, four samples A0, A1, A2 and A3 of the reception light RL may be sampled at phases of about 90 degrees, about 180 degrees, about 270 degrees and about 360 degrees per period, respectively.

FIG. 4 illustrates an example that the phase of the first demodulation signal DEM1 coincides with the phase of the transmission light TL. The first through fourth demodulation signals DEM1 through DEM4 may be applied to first through fourth demodulation transfer gates, respectively, as described below.

While FIGS. 3 and 4 are provided for describing the principal of measuring and calculating a distance to an object using a ToF sensor, it is understood that one or more other example embodiments are not limited thereto. The duty ratio of the transmission light TL and the number, the phase differences and the duty ratio of the demodulation signals may vary.

Hereinafter, a depth pixel having a four-tap structure and operation of the depth pixel are described with reference to FIGS. 5 and 6. It is understood that one or more other example embodiments are not limited to the four-tap structure, and may be applied to arbitrary depth pixels having three or more taps.

Figure 5:
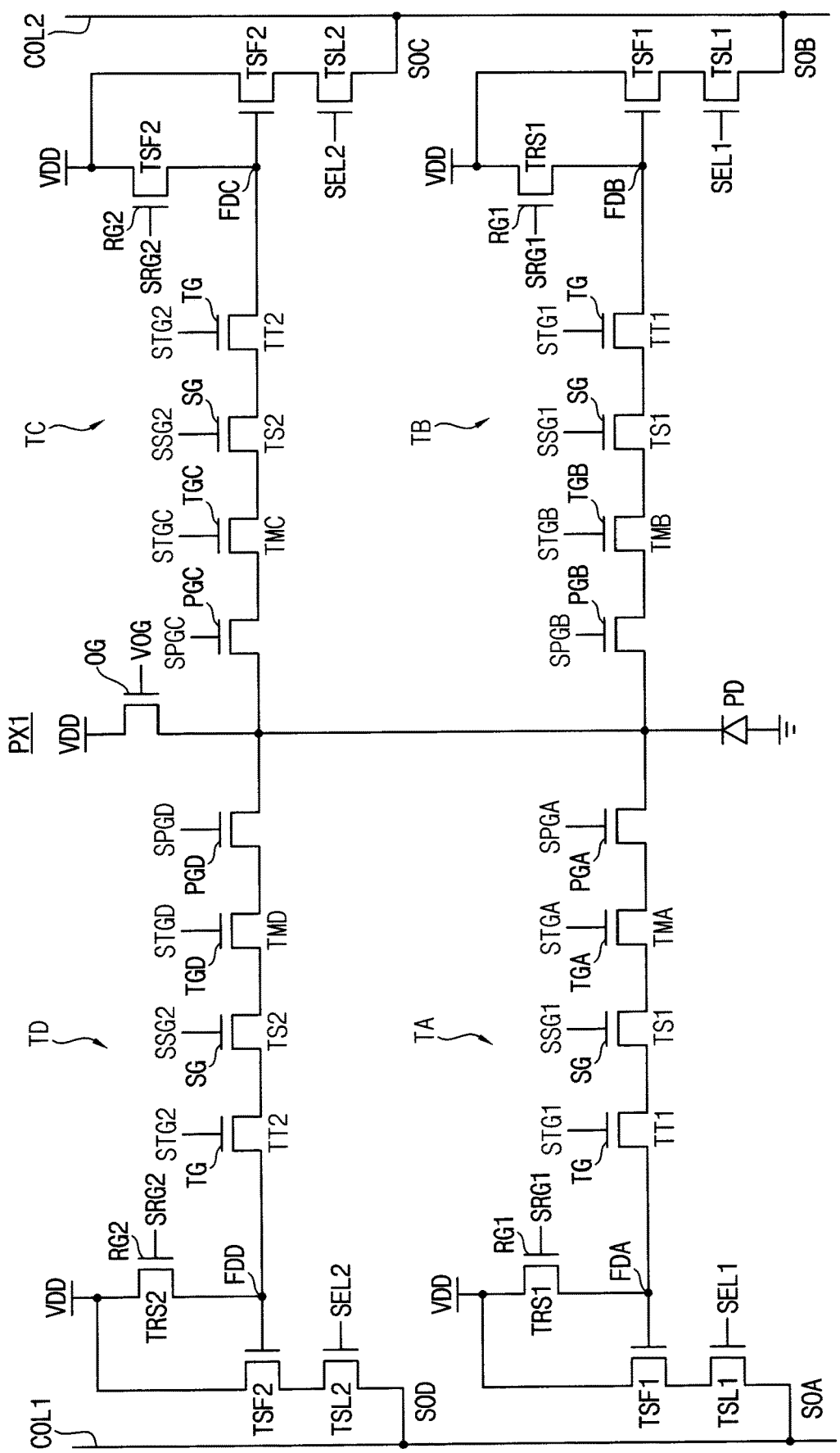
FIG. 5 is a circuit diagram illustrating an example embodiment of a depth pixel including a ToF sensor according to an example embodiment.

FIG. 5 is a circuit diagram illustrating an example embodiment of a depth pixel including a ToF sensor.

Referring to FIG. 5, the depth pixel PX1 may include a first photogate PGA and transistors TMA, TS1 and TT1 corresponding to a first tap TA, a second photogate PGB and transistors TMB, TS1 and TT1 corresponding to a second tap TB, a third photogate PGC and transistors TMC, TS2 and TT2 corresponding to a third tap TC, a fourth photogate PGD and transistors TMD, TS2 and TT2 corresponding to a fourth tap TD, transistors TRS1, TRS2, TSF1, TSF2, TSL1 and TSL2 corresponding to a readout circuit, and overflow gates OG and a photodiode corresponding to a shared circuit.

Each of the transistors TMA, TMB, TMC, TMD, TS1, TS2, TT1, TT2, TRS1 and TRS2 may include a gate disposed above a semiconductor substrate and source and drain regions disposed at both sides of the gate in the semiconductor substrate. The gates of the transistors TMA, TMB, TMC, TMD, TS1, TS2, TT1, TT2, TRS1 correspond to a first demodulation transfer gate TGA, a second demodulation transfer gate TGB, a third demodulation transfer gate TGC, a fourth demodulation transfer gate TGD, storage gates SG, FD transfer gates TG and reset gates RG1 and RG2, respectively.

First through fourth photogate signals SPGA~SPGD are applied to the first through fourth photogates PGA~PGD, an overflow gate voltage VOG is applied to the overflow gates OG storage control signals SSG1 and SSG2 are applied to the storage gates SG1 and SG2, demodulation transfer control signals STGA~STGD are applied to the demodulation transfer gates TGA~TGD, FD transfer control signals STG1 and STG2 are applied to the FD transfer gates TG1 and TG2, reset signals SRG1 and SRG2 are applied to the reset gates RG1 and RG2, and selection signals SEL1 and SEL2 are applied to the gates of the selection transistors TSL1 and TSL2. The photogate signals SPGA~SPGD, the overflow gate voltage VOG, the demodulation transfer control signals STGA~STGD, the storage control signals SSG1 and SSG2, the FD transfer control signals STG1 and STG2, the reset signals SRG1 and SRG2, and the selection signals SEL1 and SEL2 may be provided from the row scanning circuit 130 under control of the controller 150 as described above with reference to FIG. 2.

The first through fourth photogate signals SPGA~SPGD correspond to the sampling control signals as described above with reference to FIG. 1. The row scanning circuit 130 may generate the first through fourth photogate signals SPGA~SPGD corresponding to the sampling control signals based on the selected operation mode as described below.

The storage gates SG1 and SG2 are one of charge storing structures to temporarily store the photo charge transferred from the common photogate CPG before transferring the photo charge to the floating diffusion regions FDA, FDB, FDC and FDD. In some example embodiments, the charge storing structure may be implemented with the storage gates SG1 and SG2 alone. In other example embodiments, the charge storing structure may be implemented with the storage gates SG1 and SG2 and storage diodes formed in the semiconductor substrate under the storage gates SG1 and SG2. Using such a charge storing structure, the true correlated double sampling (CDS) may be performed and noise in the readout signals may be reduced. According to example embodiments, the FD transfer gates TG1 and TG2 and/or the storage gates SG1 and SG2 may be omitted.

The charge stored in the floating diffusion regions FDA, FDB, FDC and FDD may be provided as output signals, that is, the sample data SOA~SOD, using the source follower transistors TSF1 and TSF2 and the selection transistors TSL1 and TSL2.

Figure 6:
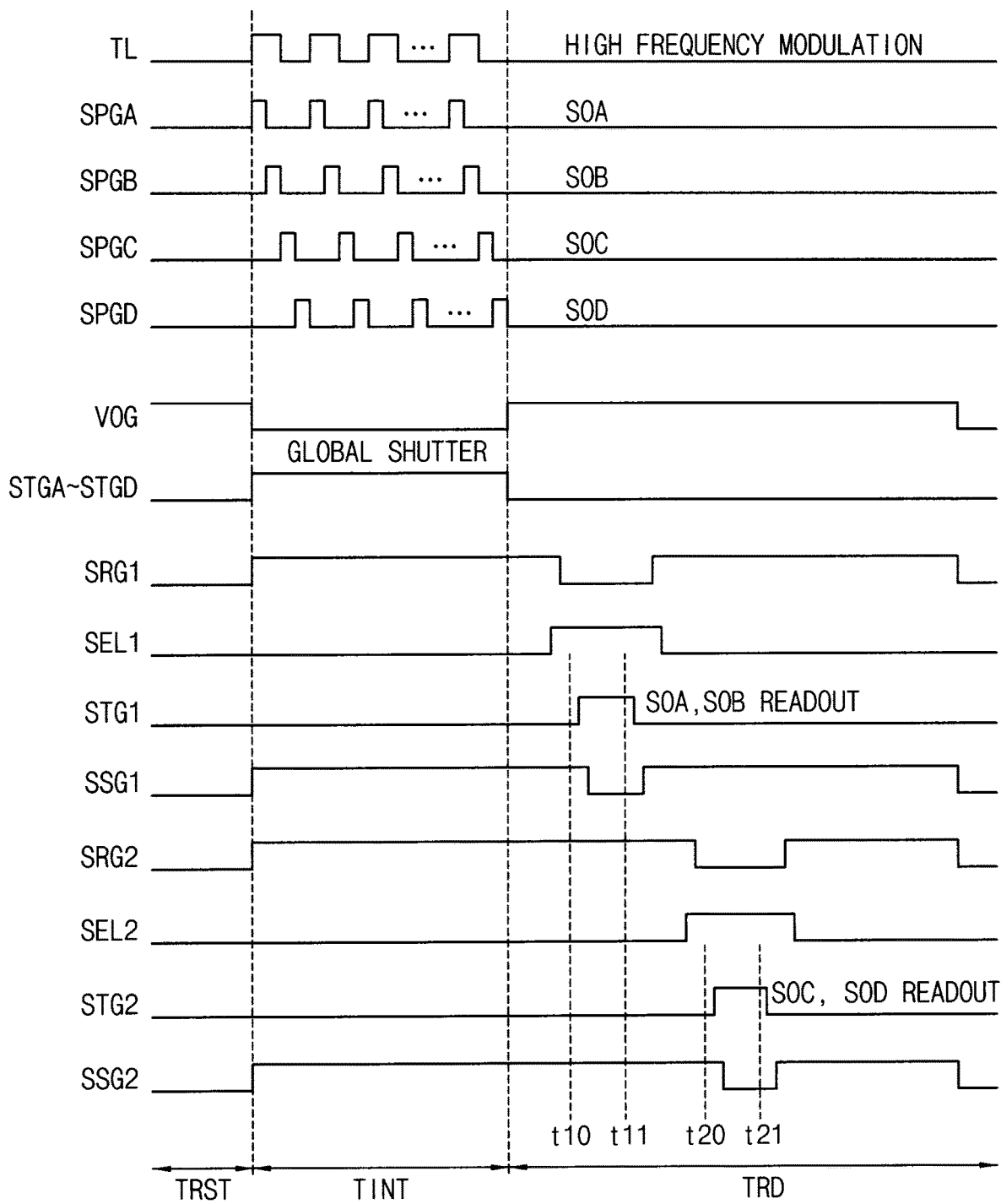
FIG. 6 is a timing diagram illustrating an operation of a ToF sensor in a distance detection mode according to an example embodiment.

FIG. 6 is a timing diagram illustrating an operation of a ToF sensor in a distance detection mode according to an example embodiment.

Referring to FIGS. 2, 5 and 6, in the distance detection mode, the light source 210 may generate the transmission light TL modulated by a modulation frequency during an integration period TINT to collect a photo charge generated by an incident light. The row scanning circuit 130 may apply the first through fourth sampling control signals, that is, the first through fourth photogate signals SPGA~SPGD having the different phases, to the first through fourth photogates PGA~PGD corresponding to the first through fourth taps TA~TD. In some example embodiments, the phase of the first photogate signal STGA may be synchronized with the phase of the transmission light TL. In some example embodiments, the phase difference between the first and second photogate signals STGA and STGB may be 90 degrees, the phase difference between the first and third photogate signals STGA and STGC may be 180 degrees, and the phase difference between the first and fourth photogate signals STGA and STGD may be 270 degrees. Using the photogate signals STGA~STGB having the different phases, the distance to the object OBJ may be measured as described above with reference to FIGS. 3 and 4.

The overflow voltage VOG applied to the overflow gates OG may have a turn-off voltage level to block the photo charge from being drained from the photodiode PD during the integration period TINT. The demodulation transfer control signals STGA~STGD and the storage control signals SSG1 and SSG2 are activated during the integration period TINT. Accordingly, the photo charge collected by the first through fourth photogate signals SPGA~SPGD may be stored in the semiconductor substrate under the storage gates SG1 and SG2, respectively.

During the other periods, for example, a reset period TRST to initialize the depth pixel PX1 and a readout period TRD to measure an amount of the photo charge collected during the integration period TINT, the overflow gate voltage VOG may have a turn-on voltage level VON to drain the photo charge from the photodiode PD. The collected photo charge may be drained to the terminal of the power supply voltage VDD during the periods TRST and TRD other than the integration period TINT. As such, a global shutter function may be implemented using the overflow gates OG.

At a first time point t10 during the readout period TRD when the reset signal SRG1 is deactivated and the selection signal SEL1 is activated, first and second reset state data of the first and second taps TA and TB may be output through the column lines COL1 and COL2, respectively. At a second time point t11 during the readout period TRD when the FD transfer control signal STG1 is activated and the storage control signal SSG1 is deactivated, the photo charge stored by the storage gates SG may be transferred to the floating diffusion regions FDA and FDB and the first and second sample data SOA and SOB of the first and second taps TA and TB may be output through the column lines COL1 and COL2, respectively.

At a third time point t20 during the readout period TRD when the reset signal SRG2 is deactivated and the selection signal SEL2 is activated, third and fourth reset state data of the third and fourth taps TC and TD may be output through the column lines COL1 and COL2, respectively. At a fourth time point t21 during the readout period TRD when the FD transfer control signal STG2 is activated and the storage control signal SSG2 is deactivated, the photo charge stored by the storage gates SG may be transferred to the floating diffusion regions FDC and FDD and the third and fourth sample data SOC and SOD of the third and fourth taps TC and TD may be output through the column lines COL1 and COL2, respectively.

Hereinafter, redundant descriptions may be omitted with respect to timing diagrams of FIGS. 8, 10, 11, 12, 13, 15, 16, 18, 19, 20 and 21 in which the signals other than the photogate signals SPGA~SPGD are the same as described with reference to FIG. 6.

Figure 7:
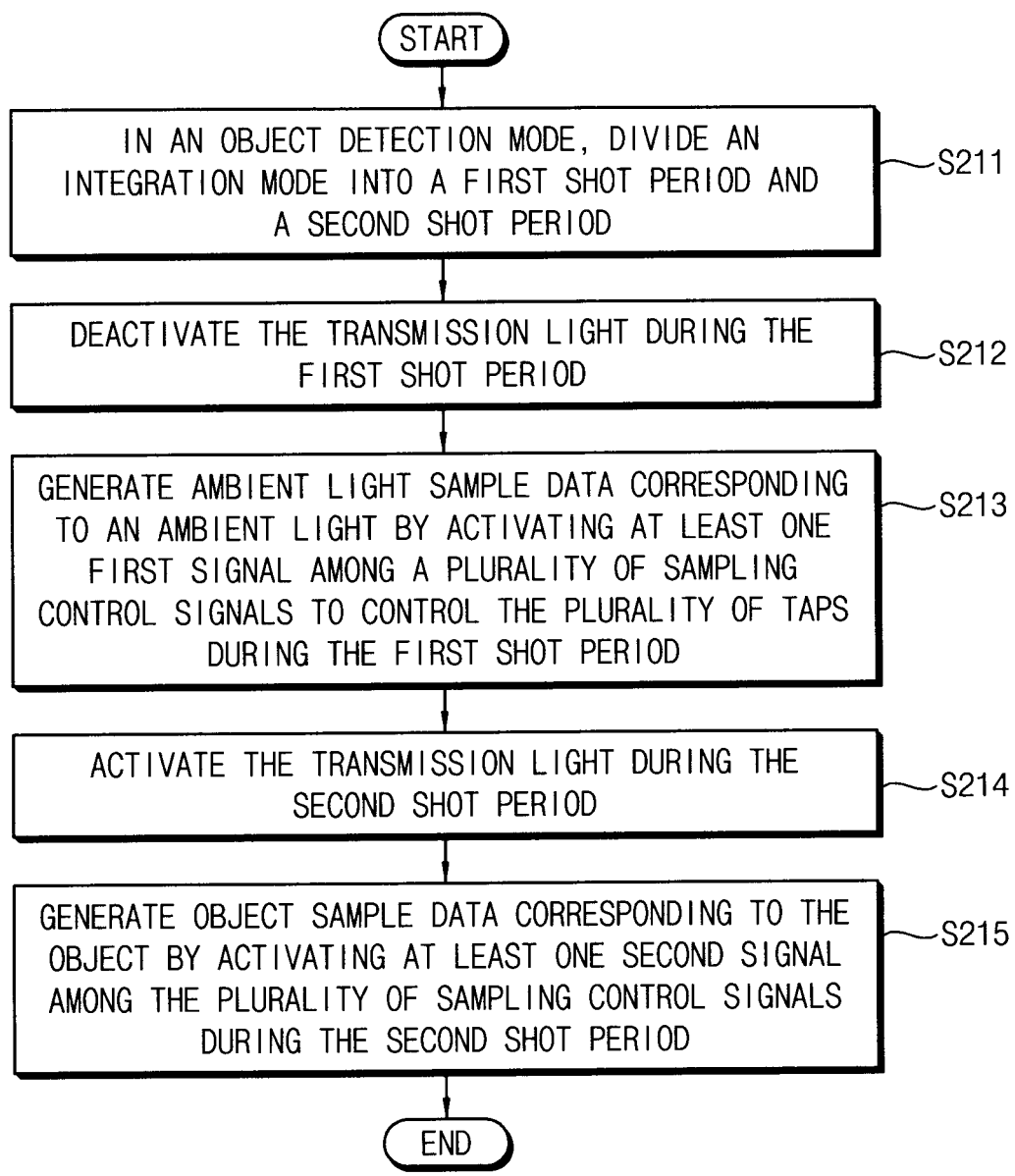
FIG. 7 is a flowchart illustrating a method of operating a ToF sensor in an object detection mode according to an example embodiment.
Figure 8:
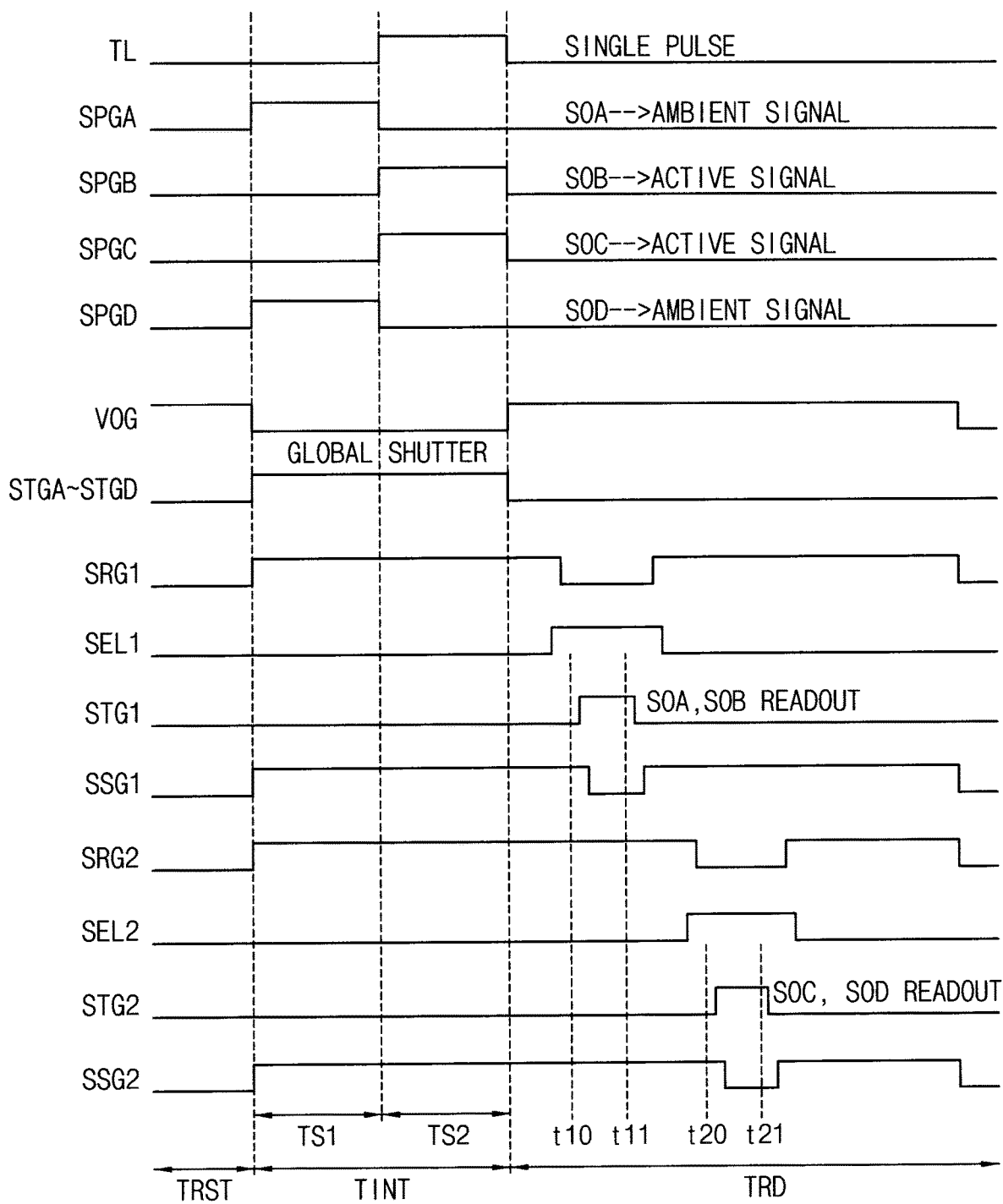
FIG. 8 is a timing diagram illustrating an operation of a ToF sensor in an objection detection mode according to an example embodiments.

FIG. 7 is a flowchart illustrating a method of operating a ToF sensor in an object detection mode according to an example embodiment, and FIG. 8 is a timing diagram illustrating an operation of a ToF sensor in an objection detection mode according to an example embodiment.

Referring to FIGS. 7 and 8, when the selected operation mode is an object detection mode to sense the existence of an object, the integration period TINT may be divided into a first shot period TS1 and a second shot period TS2 (S211)

The transmission light TL may be deactivated during the first shot period TS1 (S212), and ambient light sample data corresponding to an ambient light may be generated by activating at least one first signal among a plurality of sampling control signals to control the plurality of taps during the first shot period TS1 (S213). For example, as illustrated in FIG. 8, the photogate signals SPGA and SPGD corresponding to the at least one first signal applied to the first and fourth taps TA and TD may be activated during the first shot period TS1, and the first sample data SOA and the fourth sample data SOD may correspond to the ambient light sample data.

The transmission light TL may be activated during the second shot period TS2 (S214), and object sample data corresponding to the object may be generated by activating at least one second signal among the plurality of sampling control signals during the second shot period TS2 (S215). For example, as illustrated in FIG. 8, the photogate signals SPGB and SPGC corresponding to the at least one second signal applied to the second and third taps TB and TC may be activated during the second shot period TS2, and the second sample data SOB and the third sample data SOC may correspond to the object sample data.

As such, the integration period TINT may be divided into the first shot period TS1 and the second shot period TS2 and the multi-tap operation may be performed using the transmission light TL including a single pulse during the second shot period TS2. Through the operation during the readout period TRD as described with reference to FIG. 6, the ambient light sample data SOA and SOD and the object sample data SOB and SOC may be provided.

The sensing result corresponding to the object detection mode may be determined based on the ambient light sample data SOA and SOD and the object sample data SOB and SOC. In some example embodiments, whether the object exists within a reference distance may be determined based on a value SOB+SOC−SOA−SOD of the object sample data SOB and SOC subtracted by the ambient light sample data SOA and SOD. For example, it may be determined that the object exists within the reference distance if the value SOB+SOC−SOA−SOD is greater than a reference value corresponding to the reference distance. In some example embodiments, the readout of the reset state data at the first and third time points t10 and t20 as described above with reference to FIG. 6 may be omitted to increase the readout speed. In this case the CDS is not performed, but the reset deviations of the taps TA~TD may be canceled to some extent in the value SOB+SOC−SOA−SOD itself and the advantage of the high-speed readout may be adopted.

Figure 9:
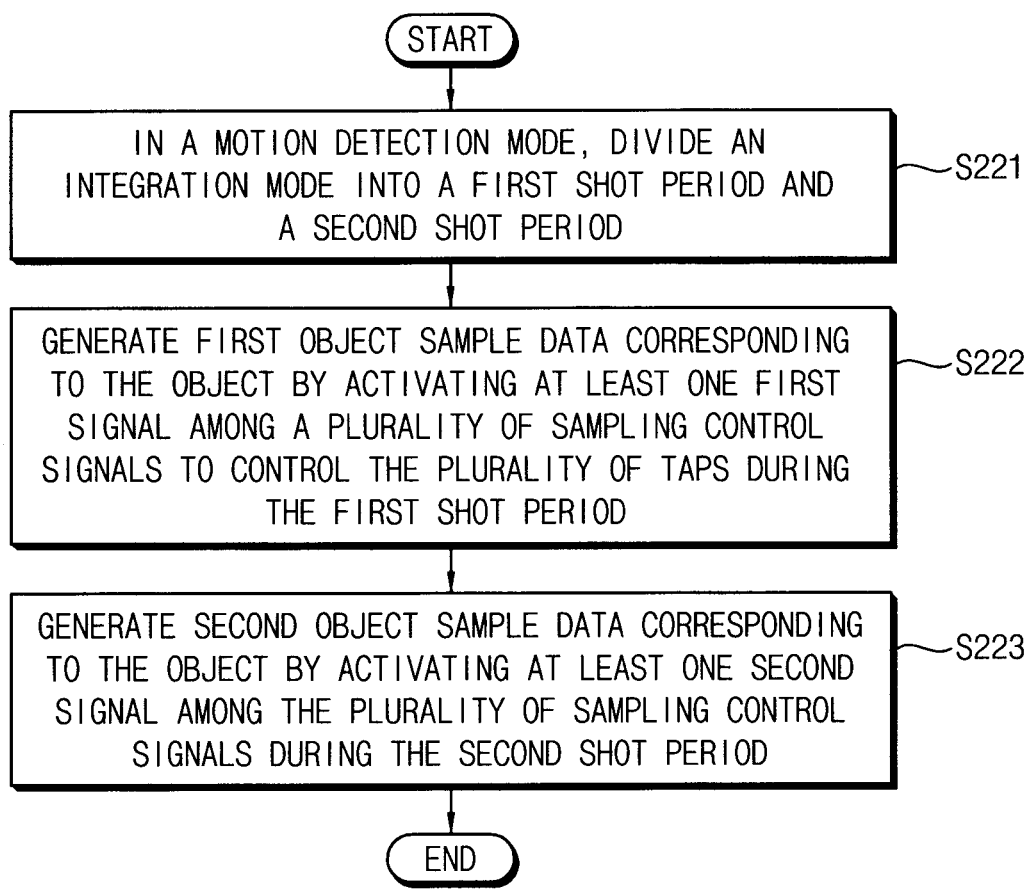
FIG. 9 is a flowchart illustrating a method of operating a ToF sensor in a motion detection mode according to an example embodiment.

FIG. 9 is a flowchart illustrating a method of operating a ToF sensor in a motion detection mode according to an example embodiment, and FIGS. 10 through 13 are timing diagrams illustrating an operation of a ToF sensor in a motion detection mode according to one or more example embodiments.

Figure 10:
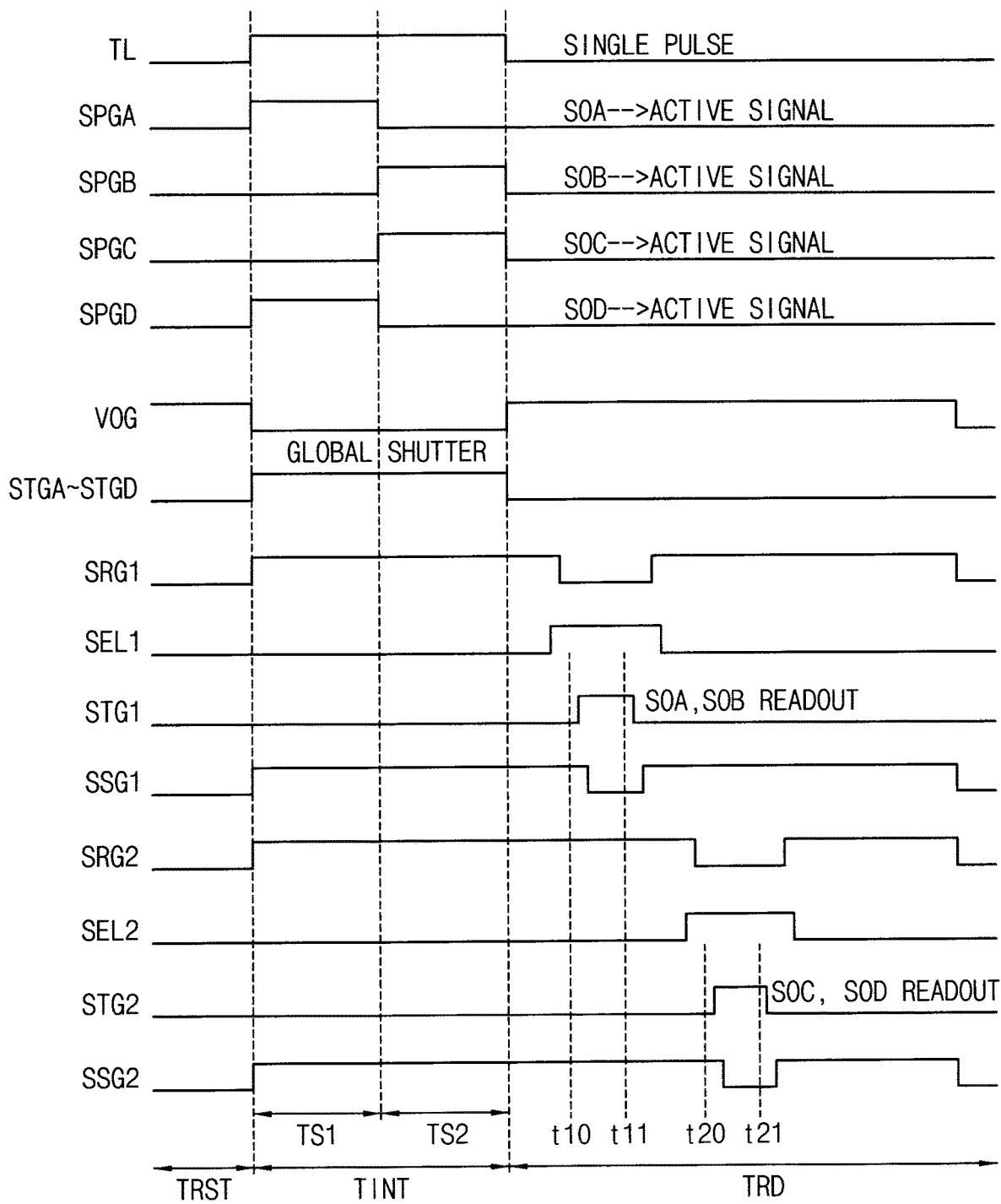
FIGS. 10 through 13 are timing diagrams illustrating an operation of a ToF sensor in a motion detection mode according to example embodiments.
Figure 11:
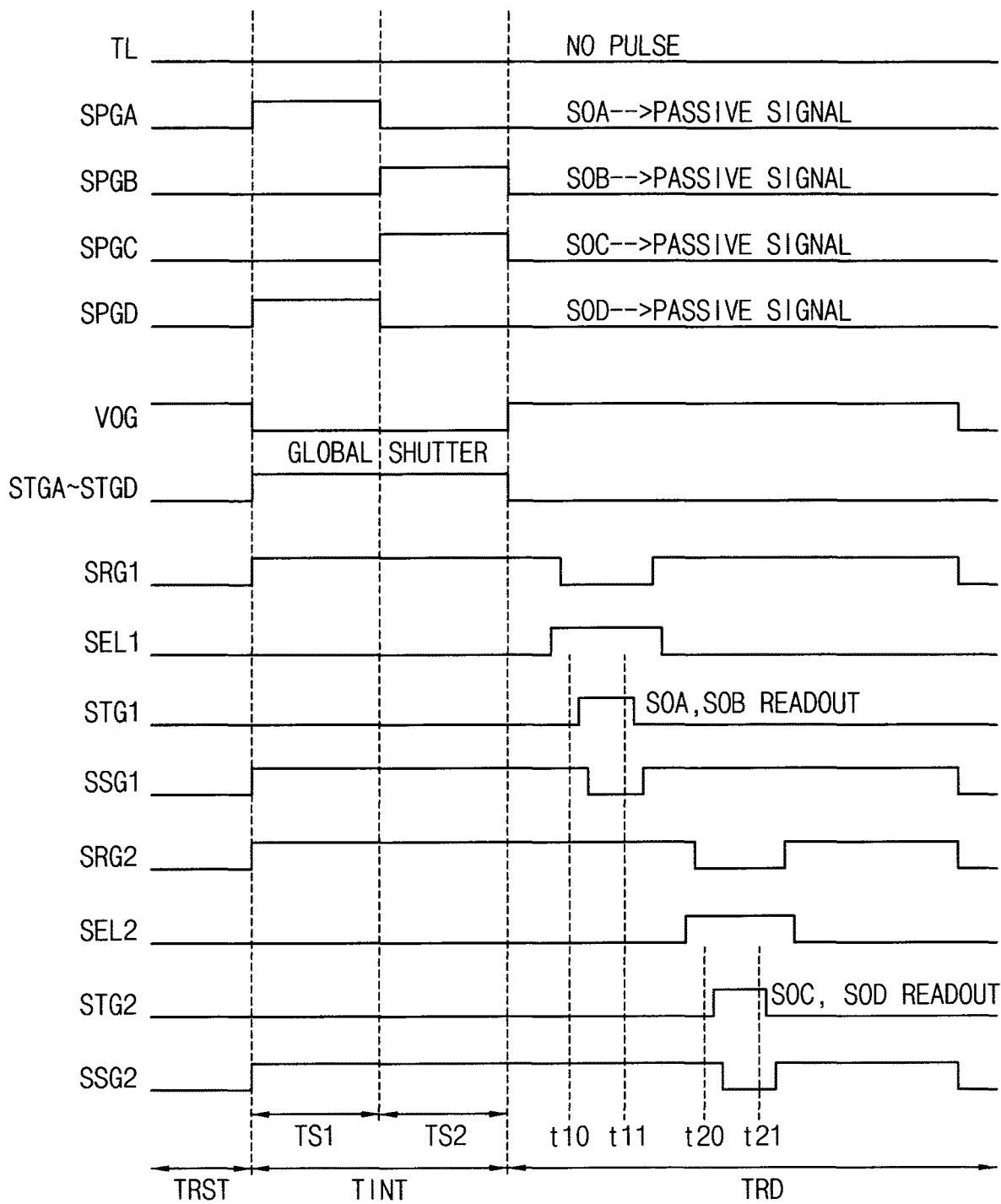

Referring to FIGS. 9, 10 and 11, when the selected operation mode is a motion detection mode to sense a motion of the object, the integration period TINT may be divided into a first shot period TS1 and a second shot period TS2 (S221).

First object sample data corresponding to the object may be generated by activating at least one first signal among a plurality of sampling control signals to control the plurality of taps during the first shot period TS1 (S222). For example, as illustrated in FIGS. 10 and 11, the photogate signals SPGA and SPGD corresponding to the at least one first signal applied to the first and fourth taps TA and TD may be activated during the first shot period TS1, and the first sample data SOA and the fourth sample data SOD may correspond to the first object sample data.

Second object sample data corresponding to the object may be generated by activating at least one second signal among the plurality of sampling control signals during the second shot period TS2 (S223). For example, as illustrated in FIGS. 10 and 11, the photogate signals SPGB and SPGC corresponding to the at least one second signal applied to the second and third taps TB and TC may be activated during the second shot period TS2, and the second sample data SOB and the third sample data SOC may correspond to the second object sample data.

In some example embodiments, as illustrated in FIG. 10, the light source 210 in FIG. 2 may be controlled to activate the transmission light TL to include a single pulse during the integration period TINT. In this case, the first object sample data SOA and SOD and the second object sample data SOB and SOC correspond to active signals related to the transmission light TL.

In some example embodiments, as illustrated in FIG. 11, the light source 210 in FIG. 2 may be controlled to deactivate the transmission light TL during the integration period TINT. In this case, the first object sample data SOA and SOD and the second object sample data SOB and SOC correspond to passive signals irrelevant to the transmission light TL.

The sensing result corresponding to the motion detection mode may be determined based on the first object sample data SOA and SOD and the second object sample data SOB and SOC. In some example embodiments, the motion of the object may be determined based on a difference value SOB+SOC−SOA−SOD between the second object sample data SOB and SOC and the first object sample data SOA and SOD. For example, it may be determined that the object moves toward the ToF sensor if the difference value SOB+SOC−SOA−SOD is a positive value. In contrast, it may be determined that the object moves far away from the ToF sensor if the difference value SOB+SOC−SOA−SOD is a negative value. In some example embodiments, the readout of the reset state data at the first and third time points t10 and t20 as described above with reference to FIG. 6 may be omitted to increase the readout speed. In this case, the CDS is not performed, but the reset deviations of the taps TA~TD may be canceled to some extent in the value SOB+SOC-SOA-SOD itself and the advantage of the high-speed readout may be adopted.

Figure 12:
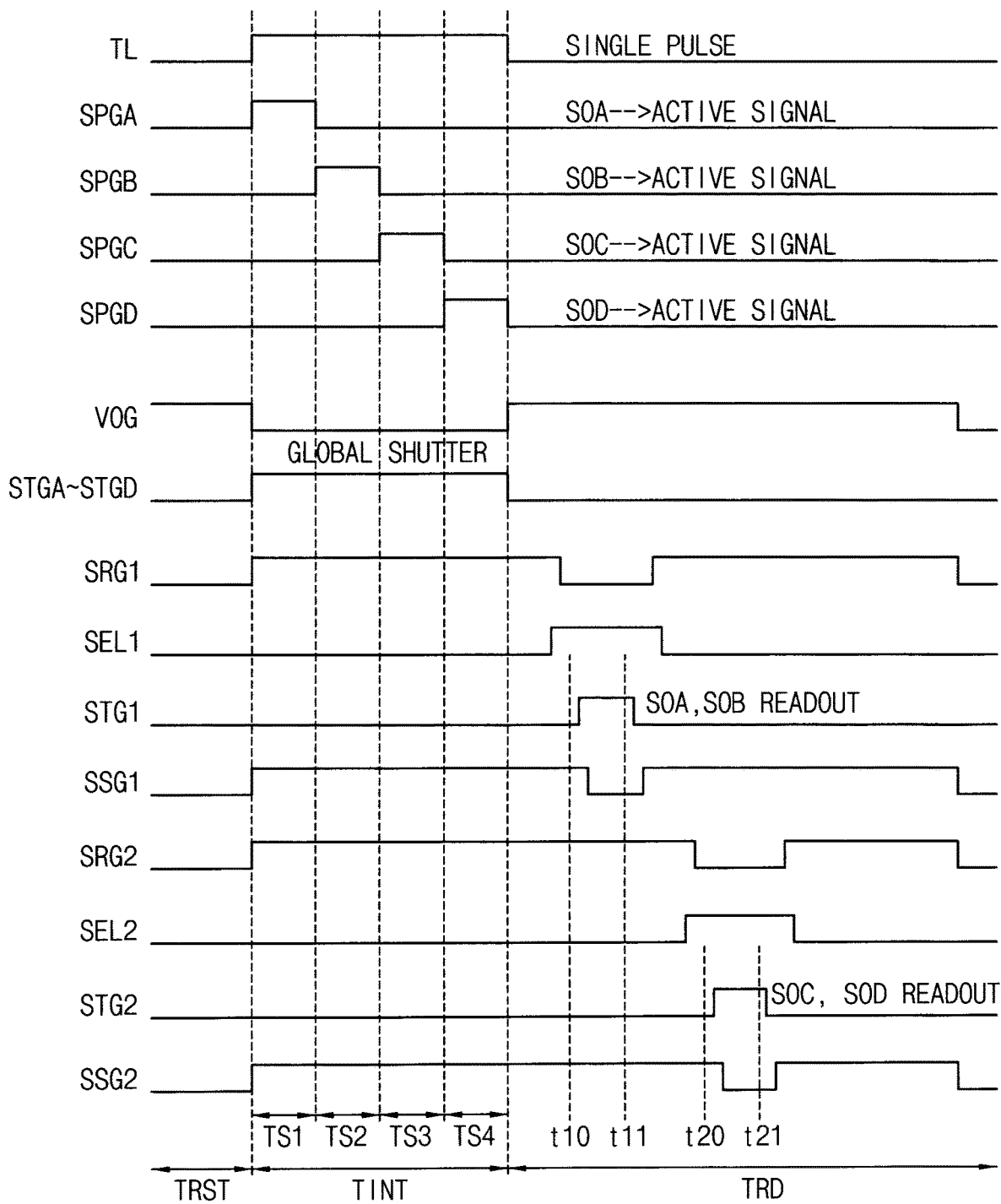
Figure 13:
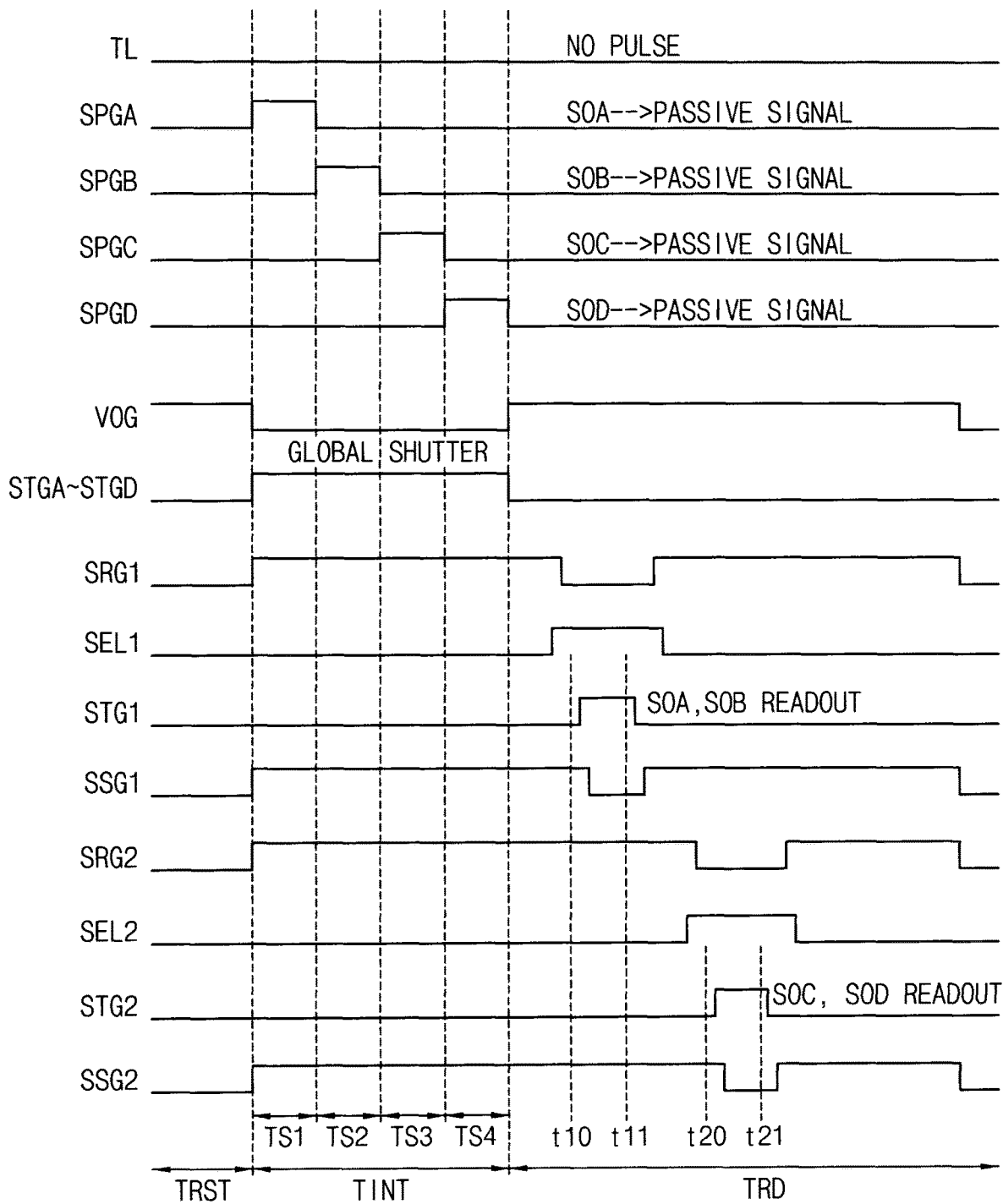

According to example embodiments, the integration period TINT may be divided into a plurality of shot periods, e.g., first through fourth shot periods TS1~TS4 as illustrated in FIGS. 12 and 13. A plurality of object sample data SOA~SOD corresponding to the object may be generated by sequentially activating a plurality of sampling control signals, that is, the first through fourth photogate signals SPGA~SPGD, to control the plurality of taps TA~TD during the plurality of shot periods TS1~TS4. When detecting high-speed motion, the integration period TINT may be divided into more shot periods to obtain further subdivided object sample data.

Figure 14:
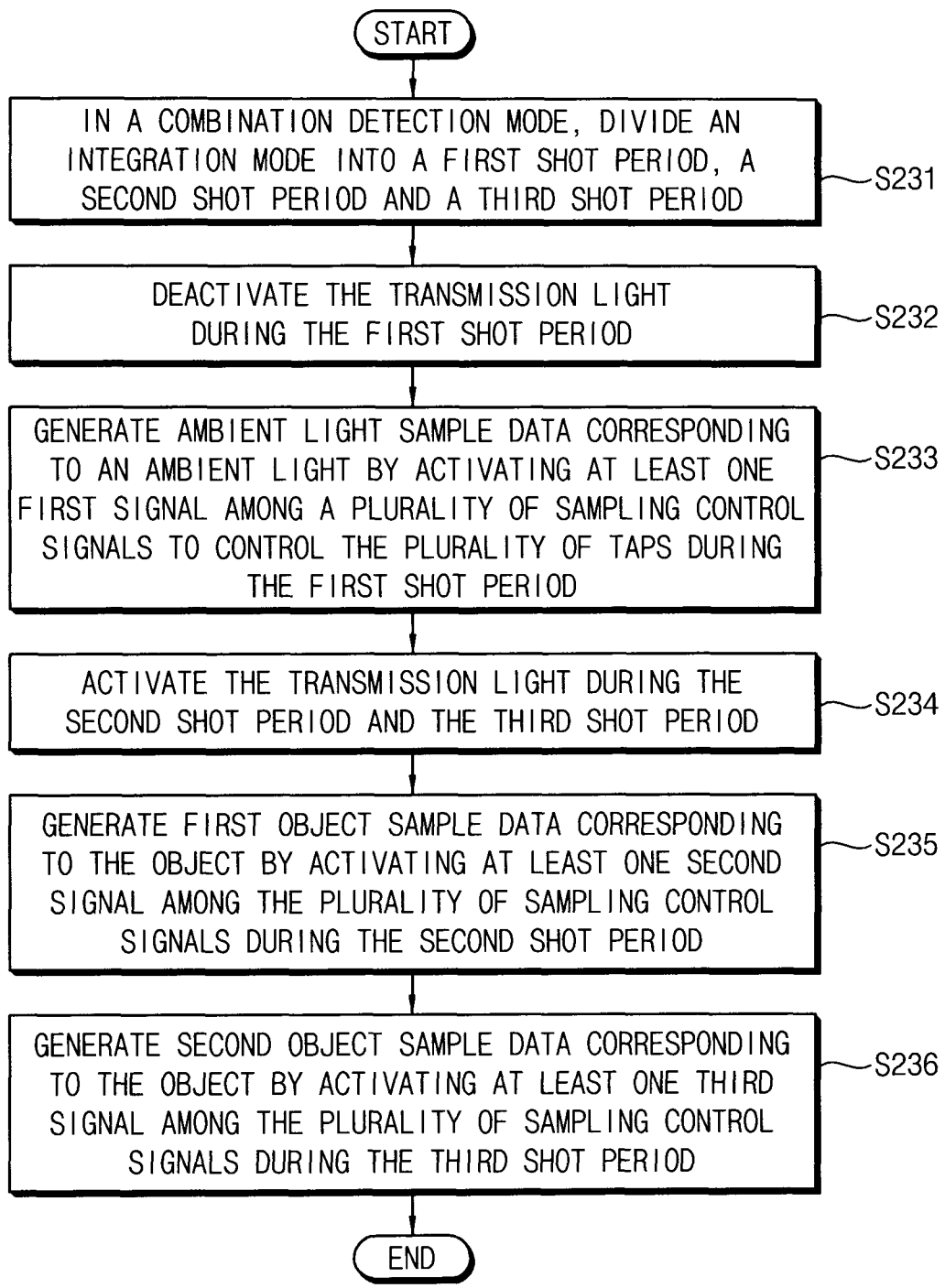
FIG. 14 is a flowchart illustrating a method of operating a ToF sensor in a combination detection mode according to an example embodiment.
Figure 15:
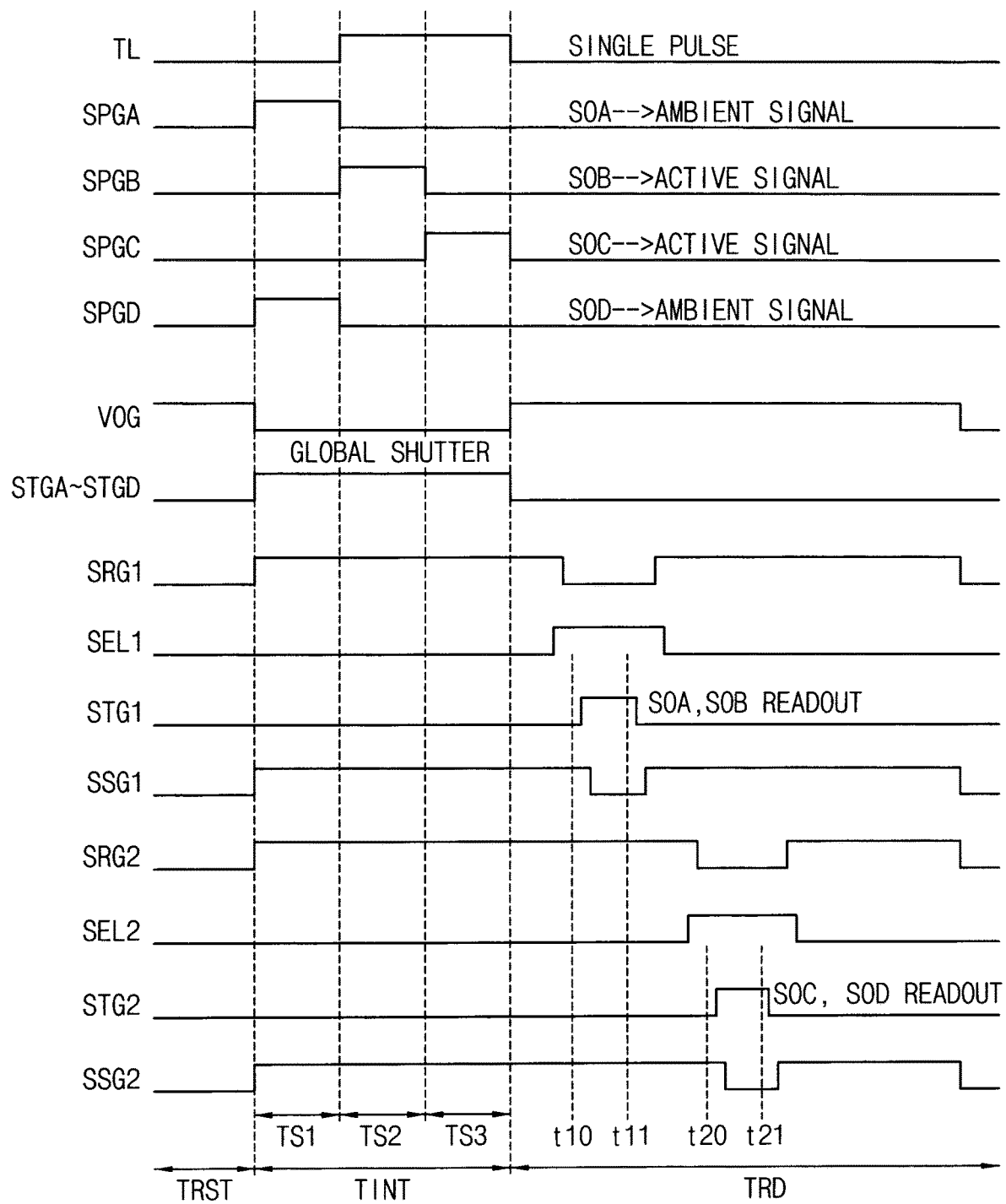
FIGS. 15 and 16 are timing diagrams illustrating an operation of a ToF sensor in a combination detection mode according to example embodiments.
Figure 16:
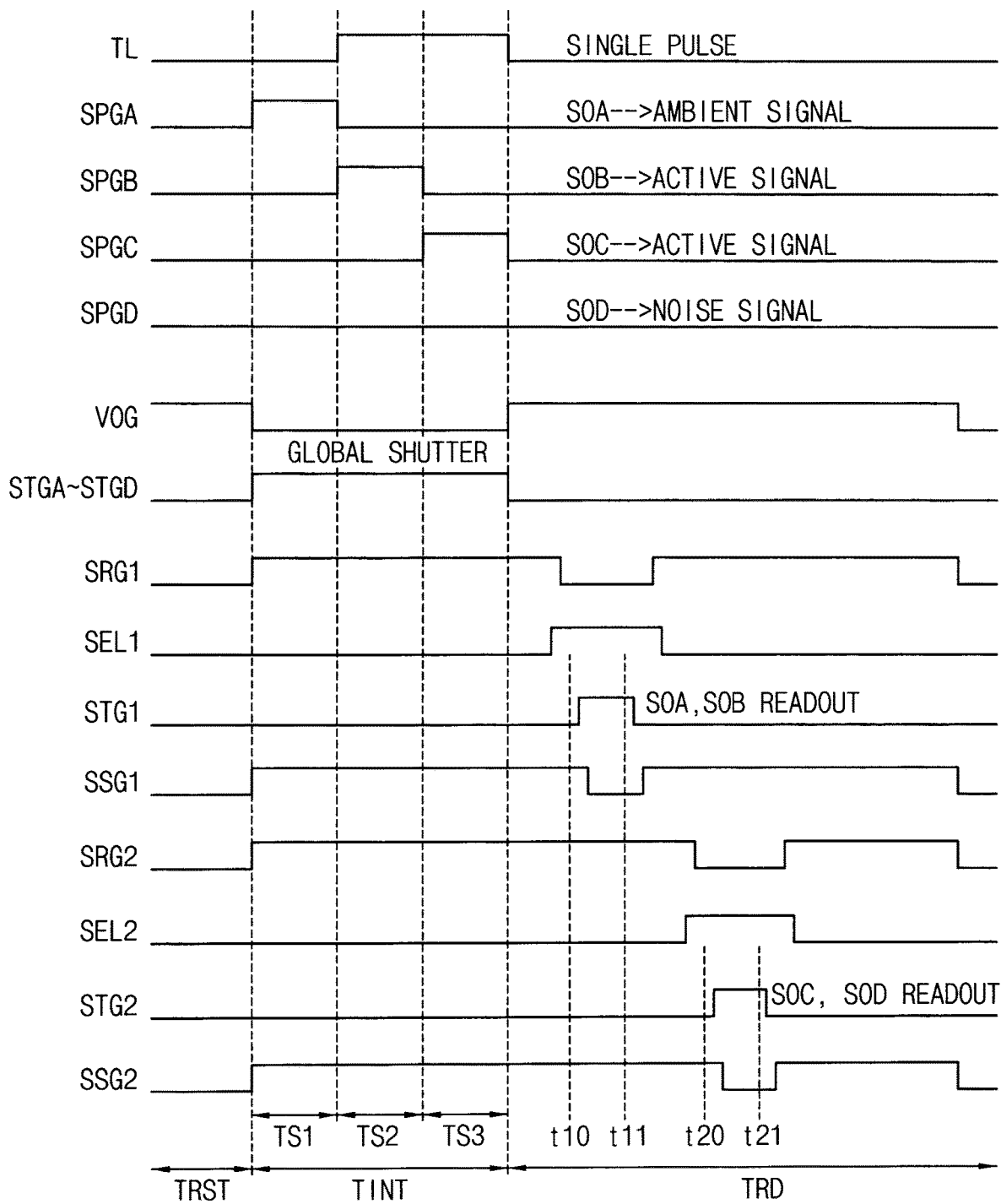

FIG. 14 is a flowchart illustrating a method of operating a ToF sensor in a combination detection mode according to an example embodiment, and FIGS. 15 and 16 are timing diagrams illustrating an operation of a ToF sensor in a combination detection mode according to one or more example embodiments.

Referring to FIGS. 14 and 15, when (or based on) the selected operation mode is a combination detection mode to simultaneously sense an existence of the object and a motion of the object, the integration period TINT may be divided into a first shot period TS1, a second shot period TS2 and a third shot period TS3 (S231).

The transmission light TL may be deactivated during the first shot period TS1 (S232), and ambient light sample data corresponding to an ambient light may be generated by activating at least one first signal among a plurality of sampling control signals to control the plurality of taps during the first shot period TS1 (S233). For example, as illustrated in FIG. 15, the photogate signals SPGA and SPGD corresponding to the at least one first signal applied to the first and fourth taps TA and TD may be activated during the first shot period TS1, and the first sample data SOA and the fourth sample data SOD may correspond to the ambient light sample data or ambient signals.

The transmission light TL may be activated during the second shot period TS2 and the third shot period TS3 (S234).

First object sample data corresponding to the object may be generated by activating at least one second signal among the plurality of sampling control signals during the second shot period TS2 (S235). For example, as illustrated in FIG. 15, the photogate signal SPGB corresponding to the at least one second signal applied to the second tap TB may be activated during the second shot period TS2, and the second sample data SOB may correspond to the first object sample data corresponding to the active signal related to the transmission light TL.

Second object sample data corresponding to the object may be generated by activating at least one third signal among the plurality of sampling control signals during the third shot period TS3 (S236). For example, as illustrated in FIG. 15, the photogate signal SPGC corresponding to the at least one third signal applied to the third tap TC may be activated during the third shot period TS3, and the third sample data SOC may correspond to the second object sample data corresponding to the active signal related to the transmission light TL.

According to example embodiments, at least one of the plurality of sampling control signals may be deactivated during the integration period TINT to generate noise sample data indicating the sensing noise of the depth pixel. For example, as illustrated in FIG. 16, the photogate signal SPGD applied to the fourth tap TD may be deactivated during the integration period TINT and the fourth sample data SOD may be used as the noise sample data or a noise signal. The sensing noise of the depth pixel may include a dark noise, a light leakage noise, an offset noise, etc.

The sensing result corresponding to the object detection mode may be determined based on the value SOB+SOC-SOA-SOD of the first and second object sample data SOB and SOC subtracted by the ambient light sample data SOA and SOD, as described above with reference to FIGS. 7 and 8. In addition, the sensing result corresponding to the motion detection mode may be determined based on the difference value SOC−SOB between the first object sample data SOB and the second object sample data SOC, as described above with reference to FIGS. 9 through 13. In the example embodiment of FIG. 16, the further finite sensing result may be obtained by compensating for the ambient light sample data SOA, the first object sample data SOB and the second object sample data SOC using the noise sample data SOD.

Figure 17:
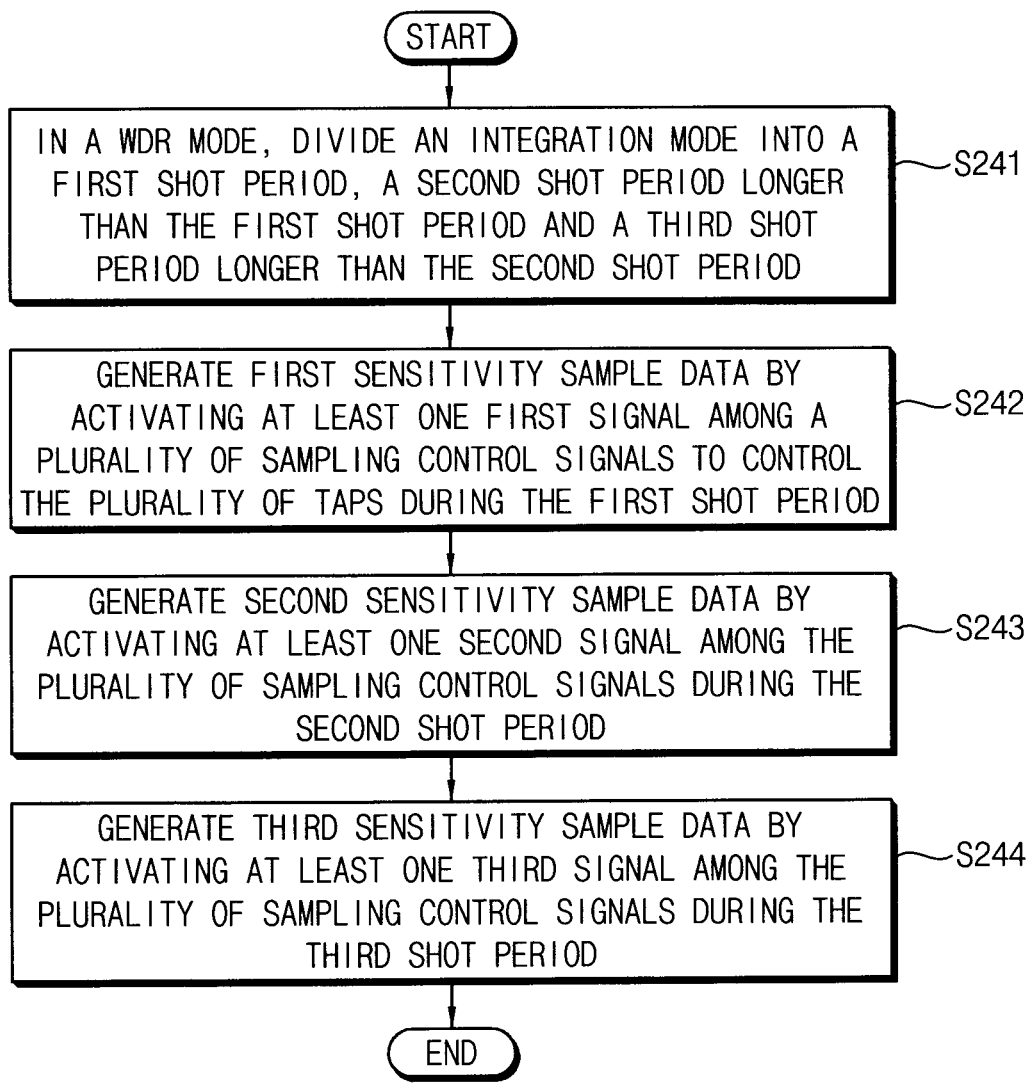
FIG. 17 is a flowchart illustrating a method of operating a ToF sensor in a wide dynamic range (WDR) mode according to an example embodiment.

FIG. 17 is a flowchart illustrating a method of operating a ToF sensor in a wide dynamic range (WDR) mode according to an example embodiment, and FIGS. 18 through 21 are timing diagrams illustrating an operation of a ToF sensor in a WDR mode according to one or more example embodiments.

The WDR scheme is used to simultaneously capture a dark portion of an image and a bright portion of the image. The problems of backlight may be solved and the clearer image may be obtained by combining the data of the higher sensing sensitivity in the dark portion and the data of the lower sensing sensitivity in the bright portion. The WDR scheme may provide a better result than the backlight compensation (BLC) scheme. The dynamic range indicates a ratio between the brightest portion and the darkest portion within the distinguishable range.

Referring to FIGS. 17 through 21, when the selected operation mode is a WDR mode to sense the object with a plurality of sensing sensitivities, the integration period TINT may be divided into a first shot period TS1, a second shot period TS2 longer than the first shot period TS1 and a third shot period TS3 longer than the second shot period TS2 (S241).

First sensitivity sample data may be generated by activating at least one first signal among a plurality of sampling control signals to control the plurality of taps during the first shot period TS1 (S242). For example, as illustrated in FIGS. 18 through 21, the photogate signal SPGA corresponding to the at least one first signal applied to the first tap TA may be activated during the first shot period TS1, and the first sample data SOA may correspond to the first sensitivity sample data of a short exposure.

Second sensitivity sample data may be generated by activating at least one second signal among the plurality of sampling control signals during the second shot period TS2 (T243). For example, as illustrated in FIGS. 18 through 21, the photogate signal SPGB corresponding to the at least one second signal applied to the second tap TB may be activated during the second shot period TS2, and the second sample data SOB may correspond to the second sensitivity sample data of a middle exposure.

Third sensitivity sample data may be generated by activating at least one third signal among the plurality of sampling control signals during the third shot period TS3 (S244). For example, as illustrated in FIGS. 18 and 19, the photogate signals SPGC and SPGD corresponding to the at least one third signal applied to the third and fourth taps TC and TD may be activated during the third shot period TS3, and the third and fourth sample data SOC and SOD may correspond to the third sensitivity sample data of a long exposure.

Figure 20:
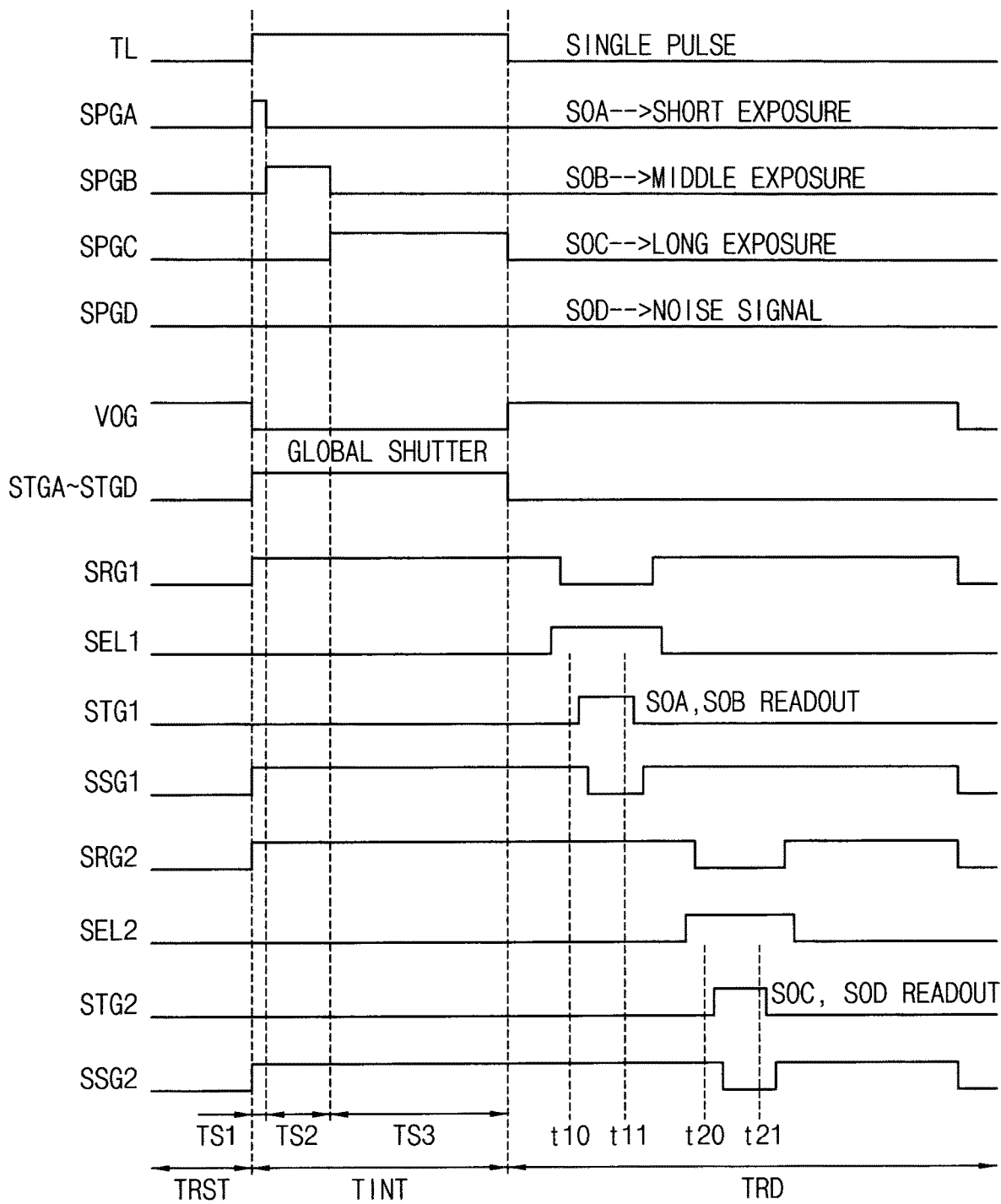
Figure 21:
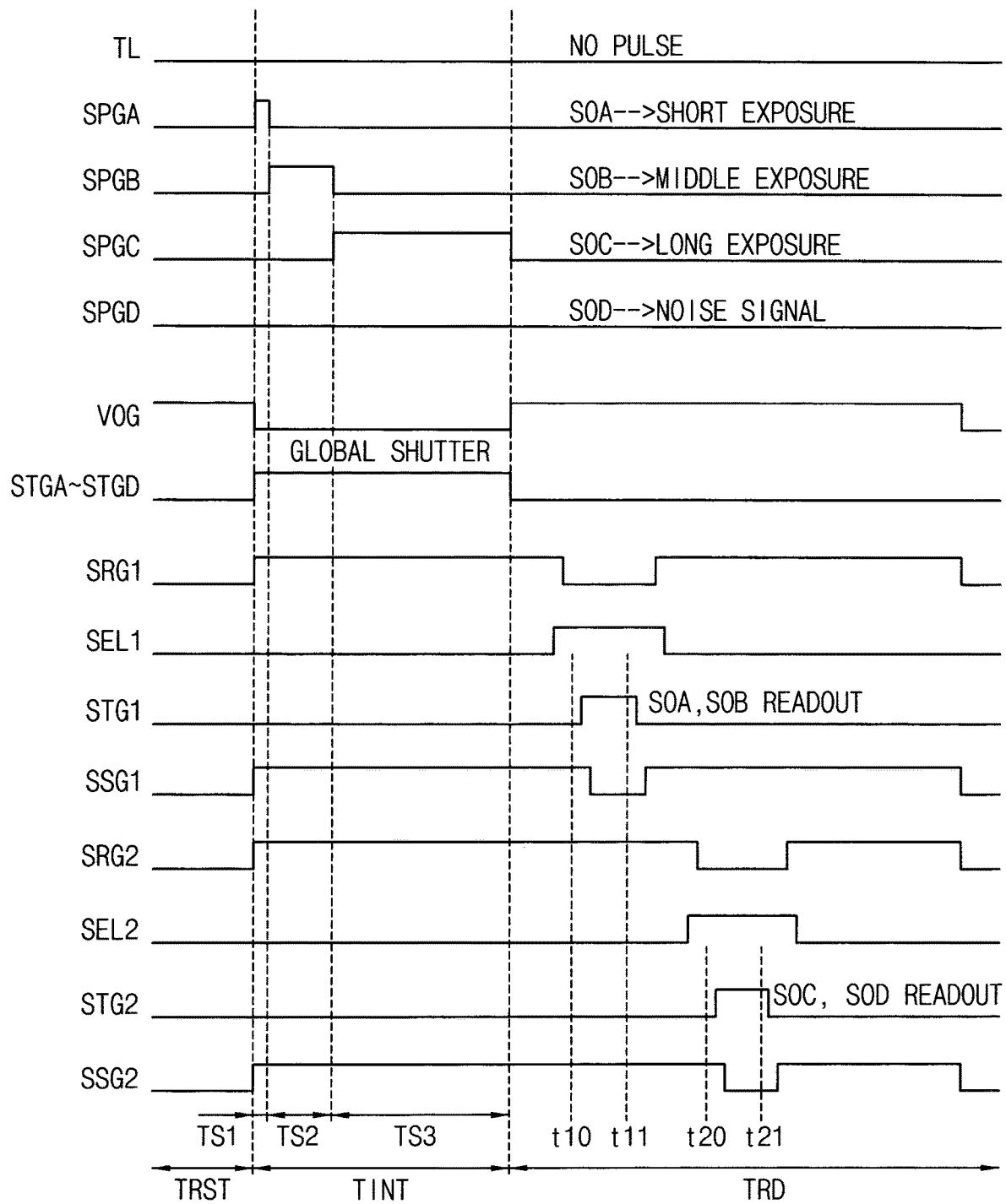

According to example embodiments, at least one of the plurality of sampling control signals may be deactivated during the integration period TINT to generate noise sample data indicating the sensing noise of the depth pixel. For example, as illustrated in FIGS. 20 and 21, the photogate signal SPGD applied to the fourth tap TD may be deactivated during the integration period TINT and the fourth sample data SOD may be used as the noise sample data or a noise signal. The sensing noise of the depth pixel may include a dark noise, a light leakage noise, an offset noise, etc.

Figure 18:
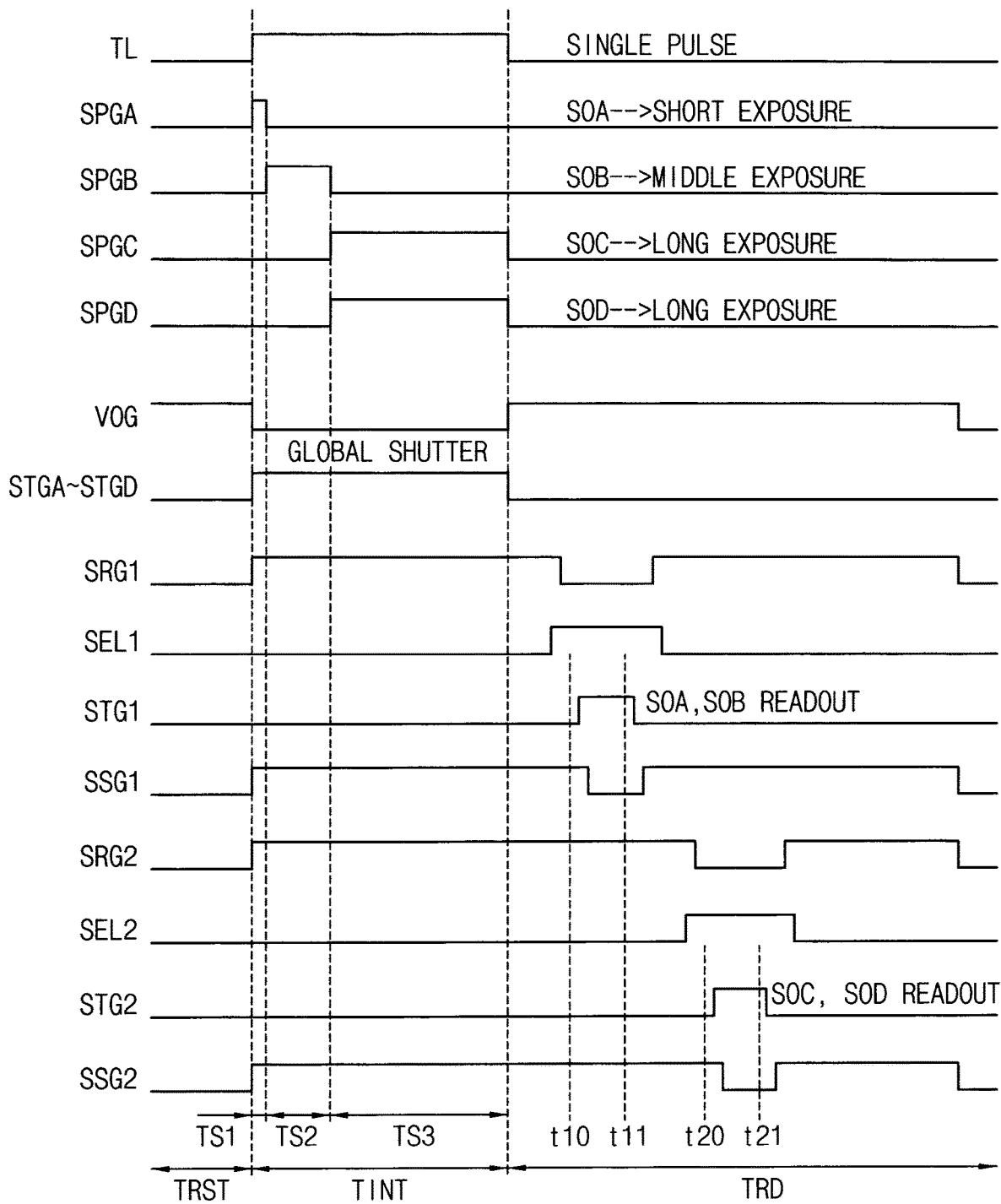
FIGS. 18 through 21 are timing diagrams illustrating an operation of a ToF sensor in a WDR mode according to example embodiments.
Figure 19:
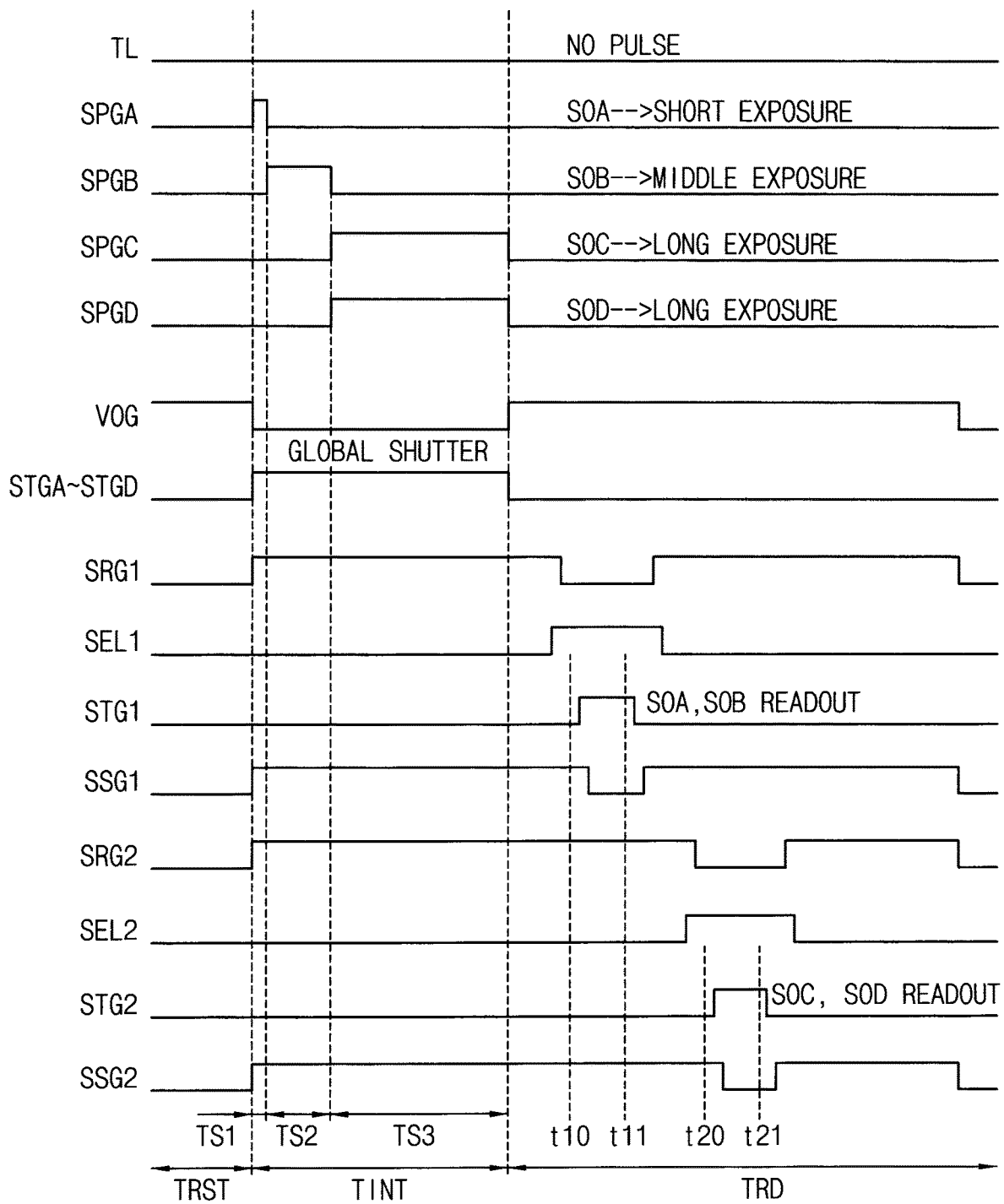

In some example embodiments, as illustrated in FIGS. 18 and 20, the light source 210 in FIG. 2 may be controlled to activate the transmission light TL to include a single pulse during the integration period TINT. In some example embodiments, as illustrated in FIGS. 19 and 21, the light source 210 in FIG. 2 may be controlled to deactivate the transmission light TL during the integration period TINT.

Figure 22:
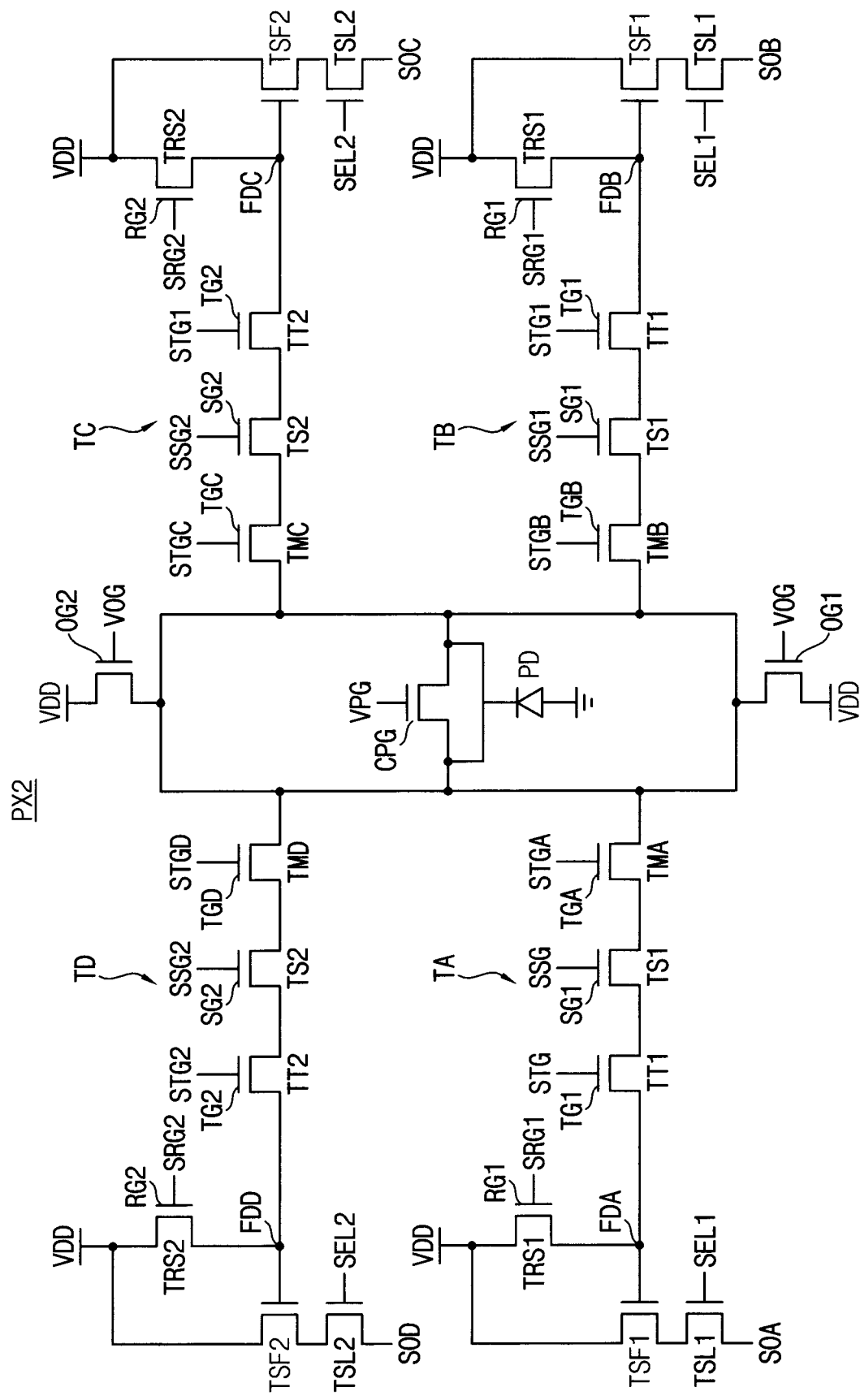
FIG. 22 is a circuit diagram illustrating a depth pixel having a four-tap structure according to an example embodiment.
Figure 23:
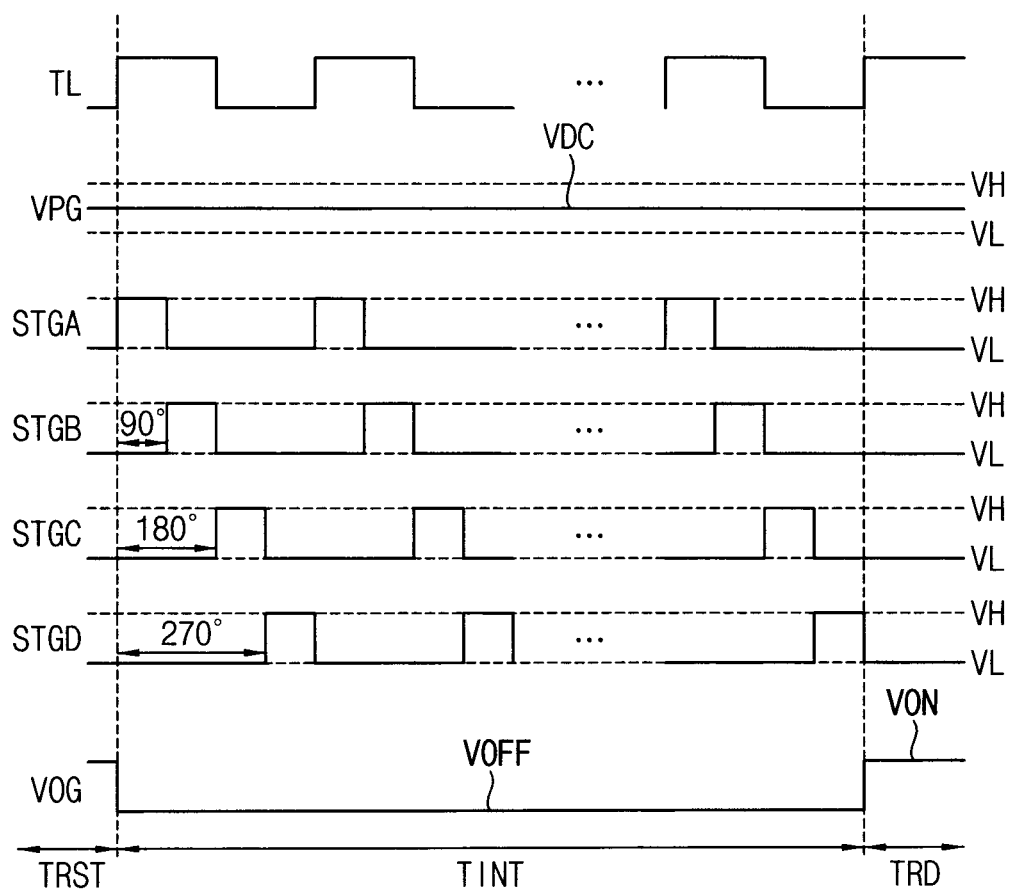
FIG. 23 is a timing diagram illustrating an example embodiment of an operation of a depth pixel in a distance detection mode.

FIG. 22 is a circuit diagram illustrating a depth pixel PX2 having a four-tap structure according to an example embodiment, and FIG. 23 is a timing diagram illustrating an example embodiment of an operation of a depth pixel in a distance detection mode. Hereinafter, descriptions redundant with those provided above with reference to FIGS. 5 and 6 may be omitted.

Referring to FIG. 22, a depth pixel PX2 may include transistors TMA, TS1 and TT1 corresponding to a first tap TA, transistors TMB, TS1 and TT1 corresponding to a second tap TB, transistors TMC, TS2 and TT2 corresponding to a third tap TC, transistors TMD, TS2 and TT2 corresponding to a fourth tap TD, transistors TRS1, TRS1, TSF1, TSF2, TSL1 and TSL2 corresponding to a readout circuit, and a common photogate CPC; overflow gates OG1 and OG2 and a photodiode PD corresponding to a shared circuit.

Each of the transistors TMA, TMB, TMC, TMD, TS1, TS2, TT1, TT2, TRS1 and TRS2 may include a gate disposed above a semiconductor substrate and source and drain regions disposed at both sides of the gate in the semiconductor substrate. The gates of the transistors TMA, TMB, TMC, TMD, TS1, TS2, TT1, TT2, TRS1 correspond to a first demodulation transfer gate TGA, a second demodulation transfer gate TGB, a third demodulation transfer gate TGC, a fourth demodulation transfer gate TGD, storage gates SG1 and SG2, FD transfer gates TG1 and TG2 and reset gates RG1 and RG2, respectively.

A photogate voltage VPG is applied to the common photogate CPG, an overflow gate voltage VOG is applied to the overflow gates OG1 and OG2, storage control signals SSG1 and SSG2 are applied to the storage gates SG1 and SG2, FD transfer control signals STG1 and STG2 are applied to the FD transfer gates TG1 and TG2, reset signals SRG1 and SRG2 are applied to the reset gates RG1 and RG2, and selection signals SEL1 and SEL2 are applied to the gate of the selection transistors TSL1 and TSL2. First through fourth demodulation transfer control signals STGA, STGB, STGC and STGD having different phases are applied to the first through fourth demodulation transfer gates TGA, TGB, TGC and TGD, respectively.

The photogate voltage VPG, the overflow gate voltage VOG, the storage control signals SSG1 and SSG2, the FD transfer control signals STG1 and STG2, the reset signals SRG1 and SRG2, the selection signals SEL1 and SEL2, and the demodulation transfer control signals STGA, STGB, STGC and STGD may be provided from the row scanning circuit 130 under control of the controller 150 as described above with reference to FIG. 2.

Referring to FIGS. 22 and 23, during the integration period TINT, the photogate voltage VPG applied to the common photogate CPG may have a DC voltage level VDC for collecting the photo charge, and the overflow gate voltage VOG applied to the overflow gates OG1 and OG2 may have a turn-off voltage level VOFF to block draining of the photo charge. In addition, during the integration period TINT, the first through fourth demodulation transfer control signals STGA, STGB, STGC and STGD of different phases may be applied to the first through fourth demodulation transfer gates TGA, TGB, TGC and TGD, respectively. The phase of the first demodulation transfer control signal STGA may be synchronized with the phase of the transmission light TL. In some example embodiments, the phase difference between the first and second demodulation transfer control signals STGA and STGB may be 90 degrees, the phase difference between the first and third demodulation transfer control signals STGA and STGC may be 180 degrees, and the phase difference between the first and fourth demodulation transfer control signals STGA and STGD may be 270 degrees. The distance measuring method using the demodulation signals of the different phases are the same as or similar to that described above with reference to FIGS. 2 through 4.

In the example embodiment of the depth pixel PX2 of FIG. 22 having the single common photogate CPC, the first through fourth demodulation transfer control signals STGA~STGD applied to the first through fourth demodulation transfer gates TGA~TGD correspond to the above-described sampling control signals. The example embodiments as described with reference to FIGS. 6 through 21 may be applied to the depth pixel PX2 of FIG. 22 in the same way by replacing the first through fourth photogate signals SPGA~SPGD with the first through fourth demodulation transfer control signals STGA~STGD.

Figure 24:
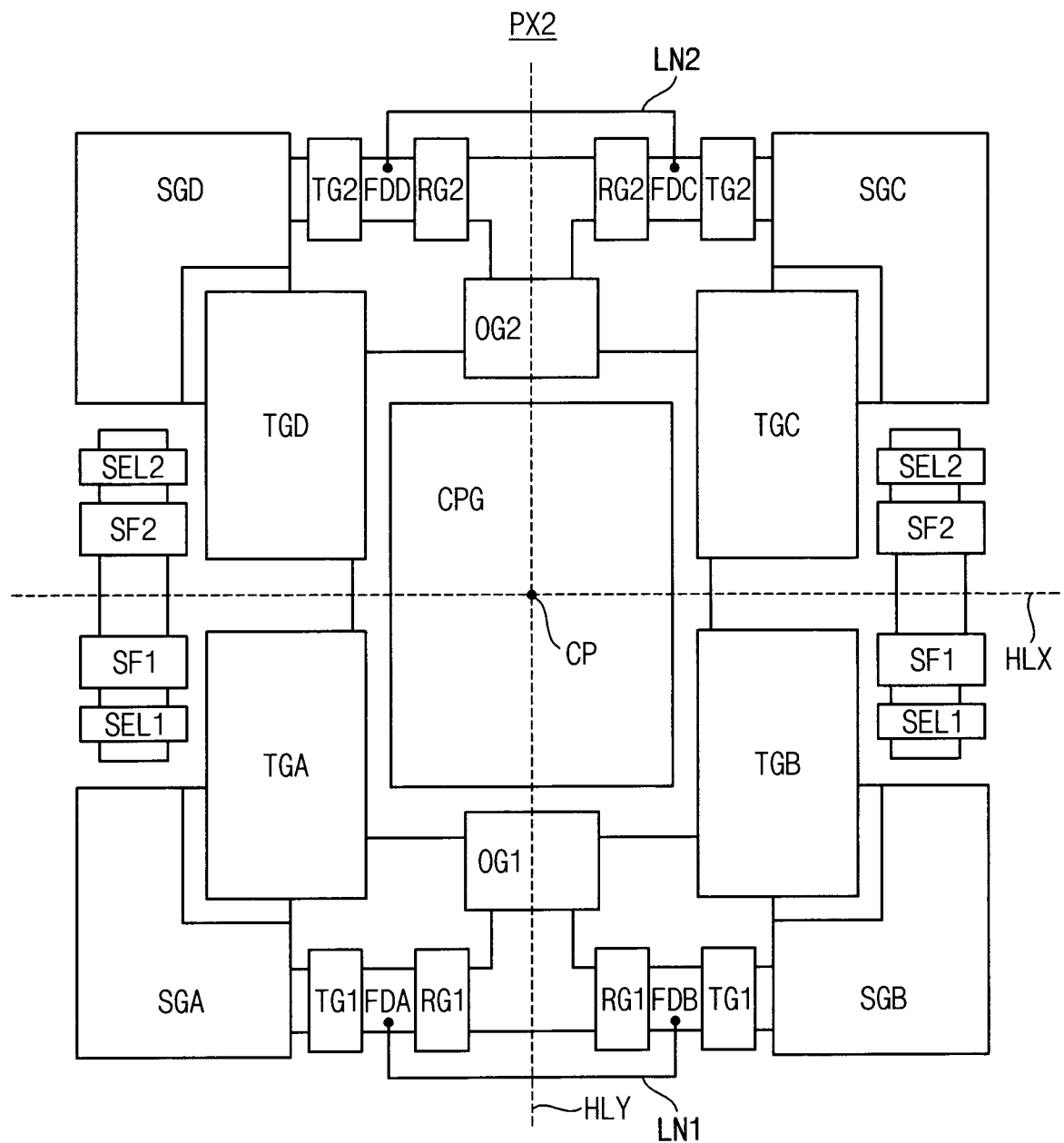
FIGS. 24 and 25 are diagrams illustrating example embodiments of a structure of sharing a floating diffusion region of a depth pixel.
Figure 25:
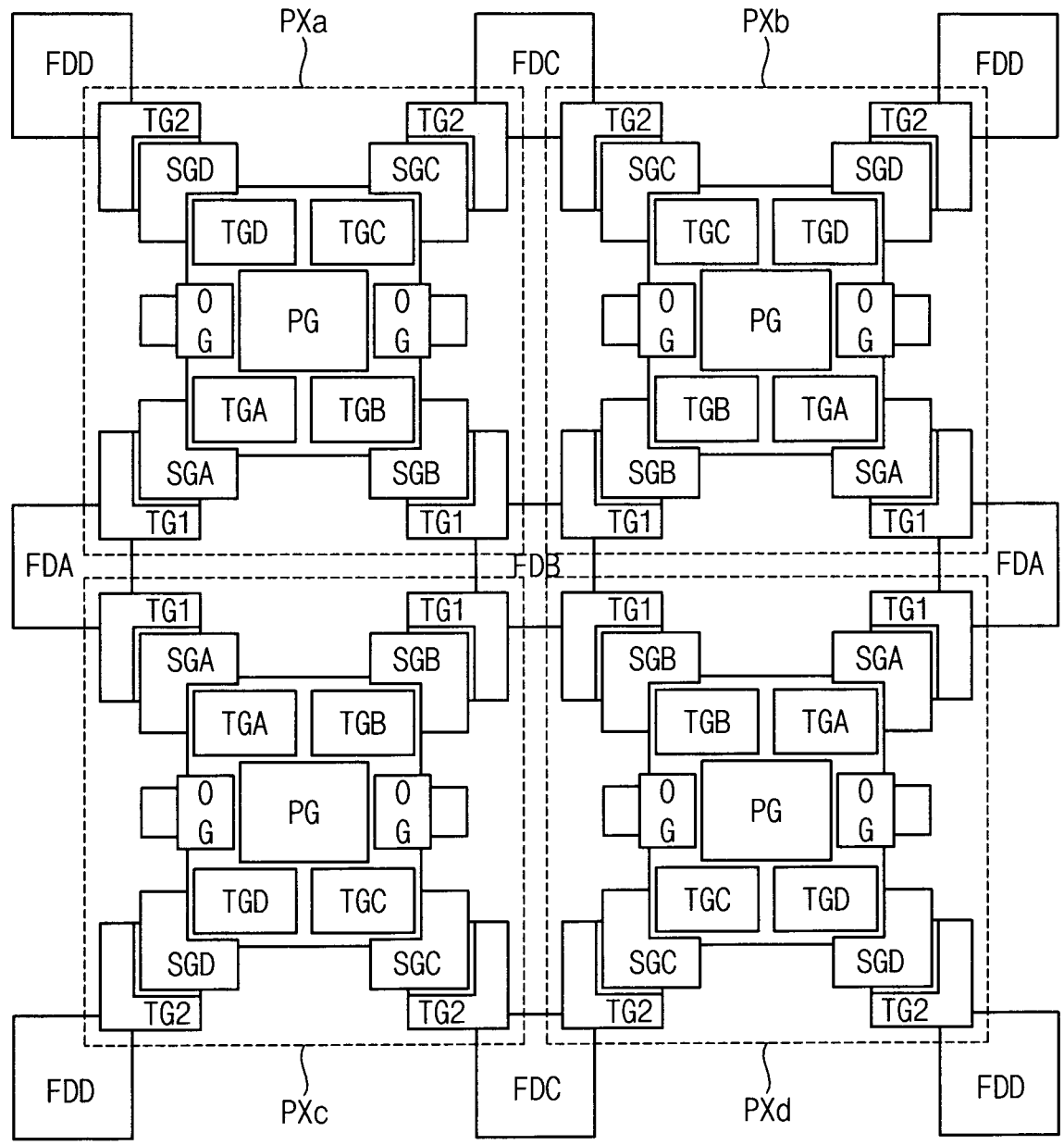

FIGS. 24 and 25 are diagrams illustrating a structure of sharing a floating diffusion region of a depth pixel according to example embodiments.

A depth pixel PX2 of FIG. 24 is substantially the same as the depth pixel PX2 of FIG. 22 having the four-tap structure and the common photogate CPG As illustrated in FIG. 24, the first floating diffusion region FDA corresponding to the first tap TA and the second floating diffusion region FDB corresponding to the second tap TB may be electrically connected to each other through a conduction path LN1. Further, the third floating diffusion region FDC corresponding to the third tap TC and the fourth floating diffusion region FDD corresponding to the fourth tap TD may be electrically connected to each other through a conduction path LN2. The conductions paths LN1 and LN2 may include conduction lines above the semiconductor substrate and vertical contacts such as vias.

In case of the depth pixel PX2 of FIG. 24, a demodulation signal having a first phase may be applied to the first and second demodulation transfer gates TGA and TGB, and a demodulation signal having a second phase different from the first phase may be applied to the third and fourth demodulation transfer gates TGC and TGD. As such, the sensing sensitivity of the depth pixel may be enhanced by electrically connecting at least two floating diffusion regions among a plurality of floating diffusion regions included in each depth pixel.

FIG. 25 illustrates four depth pixels PXa, PXb, PXc and PXD, which are adjacent in the first horizontal direction X and the second horizontal direction Y for convenience of illustration. It is understood that more pixels may be arranged repeatedly in the pixel array 110 in FIG. 2.

Referring to FIG. 25, the four adjacent depth pixels PXa, PXb, PXc and PXD may share one floating diffusion region. For example, the second demodulation signal may be applied commonly to the four taps, which are adjacent to the floating diffusion region FDB and respectively included in the four adjacent depth pixels PXa, PXb, PXc and PXD, and the photo charge collected by the four adjacent depth pixels PXa, PXb, PXc and PXD may be summed into the centered floating diffusion region FDB. In this way, the photo charge collected by every four adjacent depth pixels may be summed into the floating diffusion regions FDA, FDB, FDC and FDD, respectively, depending on the phases of the demodulation signals. As such, the sensing sensitivity of the ToF sensor may be enhanced through the structure of sharing the floating diffusion region.

Figure 26:
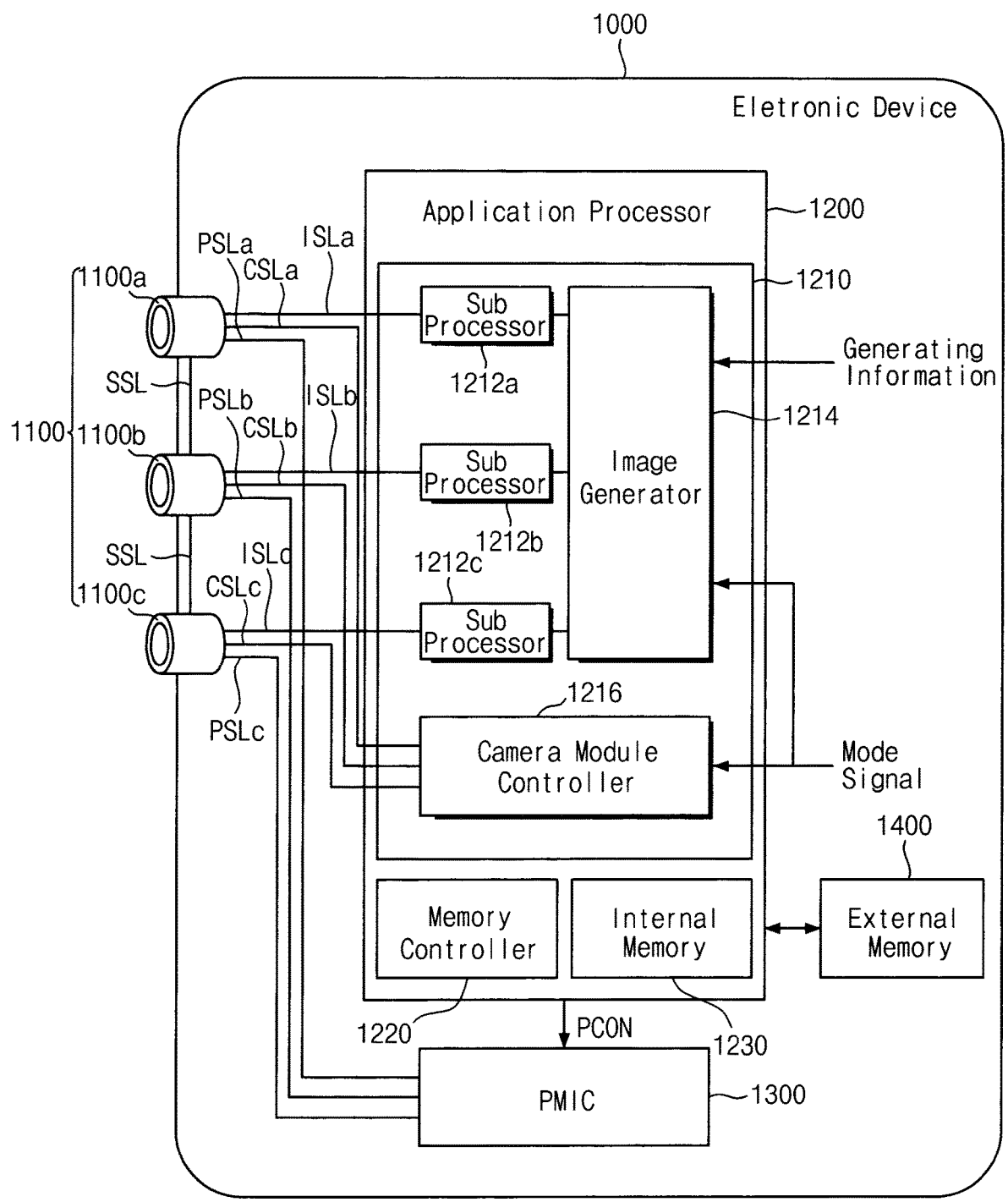
FIG. 26 is a block diagram illustrating an electronic device according to an example embodiment.
Figure 27:
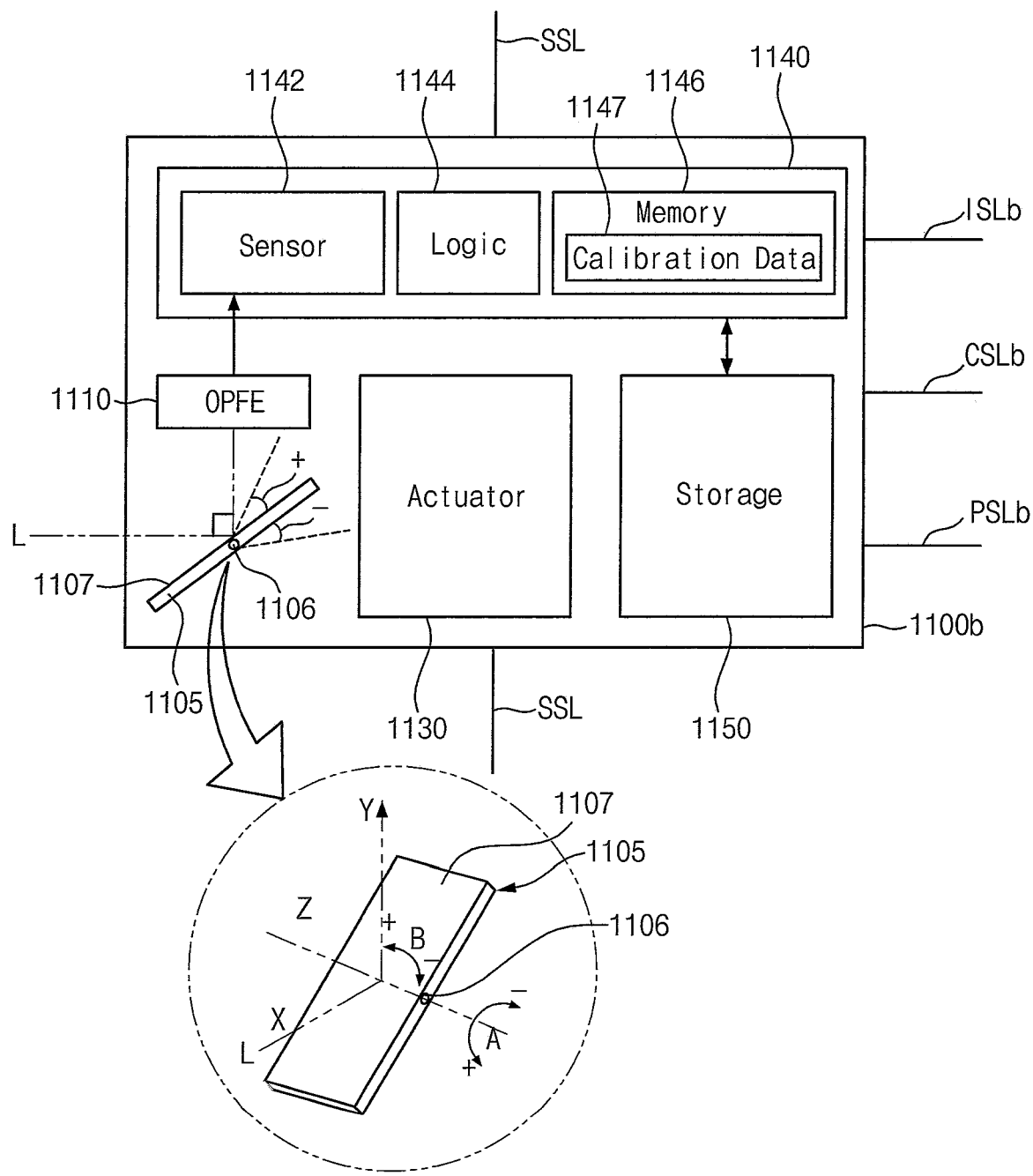
FIG. 27 is a block diagram illustrating a camera module included in the electronic device of FIG. 26.

FIG. 26 is a block diagram illustrating an electronic device 1000 according to an example embodiment, and FIG. 27 is a block diagram illustrating a camera module 1100b included in the electronic device of FIG. 26.

Referring to FIG. 26, an electronic device 1000 may include a camera module group 1100, an application processor 1200, a power management integrated circuit (PMIC) 1300 and an external memory 1400.

The camera module group 1100 may include a plurality of camera modules 1100a, 1100b and 1100c. At least one of the camera modules 1100a, 1100b and 1100c may include a multi-function ToF sensor as described above with reference to FIGS. 1 through 25. FIG. 26 illustrates three camera modules 1100a, 1100b and 1100c as an example, and it is understood that example embodiments are not limited to a particular number of camera modules. According to other example embodiments, the camera module group 1100 may include two camera modules, and four or more camera modules.

Hereinafter, an example configuration of the camera module 1100b is described with reference to FIG. 27. The same descriptions may be applied to one or more of the other camera modules 1100a and 1100c.

Referring to FIG. 27, the camera module 1100b may include a prism 1105, an optical path folding element (OPFE) 1110, an actuator 1130, an image sensing device 1140 and a storage device 1150.

The prism 1105 may include a reflection surface 1107 to change a path of a light L incident on the prism 1105.

In some example embodiment, the prism 1105 may change the path of the light L incident in a first direction X to the path in a second direction Y perpendicular to the first direction X. In addition, the prism 1105 may rotate the reflection surface 1107 around a center axis 1106 and/or rotate the center axis 1106 in the B direction to align the path of the reflected light along the second direction Y. Also the OPFE 1110 may move in a third direction perpendicular to the first direction X and the second direction Y.

A rotation angle of the prism 1105 may be smaller than 15 degrees in the positive (+) A direction and greater than 15 degrees in the negative (−) A direction, but it is understood that one or more other example embodiments are not limited thereto.

Further, the prism 1105 may rotate within 20 degrees in the positive B direction and the negative B direction, but it is understood that one or more other example embodiments are not limited thereto.

Additionally, the prism 1105 may move the reflection surface 1106 in the third direction Z that is in parallel with the center axis 1106.

The OPFE 1110 may include optical lenses that are divided into m groups where m is a positive integer. The m lens group may move in the second direction Y to change an optical zoom ratio of the camera module 1100b. For example, the optical zoom ratio may be changed in a range of 3K, 5K, and so on by moving the m lens group, when K is a basic optical zoom ratio of the camera module 1100b.

The actuator 1130 may move the OPFE 1110 or the optical lens to a specific position. For example, the actuator 1130 may adjust the position of the optical lens for accurate sensing such that an image sensor 1142 may be located at a position corresponding to a focal length of the optical lens.

The image sensing device 1140 may include an image sensor 1142, a control logic 1144 and a memory 1146. The image sensor 1142 may capture or sense an image using the light provided through the optical lens. The control logic 1144 may control overall operations of the camera module 1100b. For example, the control logic 1144 may provide control signals through a control signal line CSLb to control the operation of the camera module 1100b.

The memory 1146 may store information such as calibration data 1147 for the operation of the camera module 1100b. For example, the calibration data 1147 may include information for generation of image data based on the provided light, such as information on the above-described rotation angle, a focal length, information on an optical axis, and so on. When the camera module is implemented as a multi-state camera having a variable focal length depending on the position of the optical lens, the calibration data 1147 may include multiple focal length values and auto-focusing values corresponding to the multiple states.

The storage device 1150 may store the image data sensed using the image sensor 1142. The storage device 1150 may be disposed output of the image sensing device 1140, and the storage device 1150 may be staked with a sensor chip comprising the image sensing device 1140. The storage device 1150 may be implemented with an electrically erasable programmable read-only memory (EEPROM), although it is understood that one or more other example embodiments are not limited thereto.

Referring to FIGS. 26 and 27, each of the camera modules 1100a, 1100b and 1100c may include an actuator 1130. In this case, the camera modules 1100a, 1100b and 1100c may include the same or different calibration data 1147 depending on the operations of the actuators 1130.

In some example embodiments, one camera module 1100b may have a folded lens structure included the above-described prism 1105 and the OPFE 1110, and the other camera modules 1100a and 1100b may have a vertical structure without the prism 1105 and the OPFE 1110.

In some example embodiments, one camera module 1100c may be a depth camera configured to measure distance information of an object using an infrared light. In this case, the application processor 1200 may merge the distance information provided from the depth camera 1100c and image data provided from the other camera modules 1100a and 1100b to generate a three-dimensional depth image.

In some example embodiments, at least two camera modules among the camera modules 1100a, 1100b and 1100c may have different fields of view, for example, through different optical lenses.

In some example embodiments, each of the camera modules 1100a, 1100b and 1100c may be separated physically from each other. In other words, the camera modules 1100a, 1100b and 1100c may include a dedicated image sensor 1142, respectively.

The application processor 1200 may include an image processing device 1210, a memory controller 1220 and an internal memory 1230. The application processor 1200 may be separated from the camera modules 1100a, 1100b and 1100c. For example, the application processor 1200 may be implemented as one chip and the camera modules 1100a, 1100b and 1100c may implemented as another chip or other chips.

The image processing device 1210 may include a plurality of sub processors 1212a, 1212b and 1212c, an image generator 1214 and a camera module controller 1216.

The image data generated by the camera modules 1100a, 1100b and 1100c may be provided to the sub processors 1212a, 1212b and 1212c through distinct image signal lines ISLa, ISLb and ISLc, respectively. For example, the transfer of the image data may be performed using a camera serial interface (CSI) based on mobile industry processor interface (MIPI), although it is understood that one or more other example embodiments are not limited thereto.

In some example embodiments, one sub processor may be assigned commonly to two or more camera modules. In this case, a multiplexer may be used to transfer the image data selectively from one of the camera modules to the shared sub processor.

The image data from the sub processors 1212a, 1212b and 1212c may be provided to the image generator 1214. The image generator 1214 may generate an output image using the image data from the sub processors 1212a, 1212b and 1212c according to image generating information or a mode signal. For example, the image generator 1213 may merge at least a portion of the image data from the camera modules 1100a, 1100b and 1100c having the different fields of view to generate the output image according to the image generating information or the mode signal. In addition, the image generator 1214 may select, as the output image, one of the image data from the camera modules 1100a, 1100b and 1100c according to the image generating information or the mode signal.

In some example embodiments, the image generating information may include a zoom factor or a zoom signal. Further, the mode signal may be a signal based on a selection of a user.

When the image generating information is the zoom factor and the camera modules 1100a, 1100b and 1100c have the different fields of view, the image generator 1214 may perform different operations depending on the zoom signal. For example, when (or based on) the zoom signal is a first signal, the image generator 1214 may merge the image data from the different camera modules to generate the output image. When the zoom signal is a second signal different from the first signal, the image generator 1214 may select, as the output image, one of image data from the camera modules 1100a, 1100b and 1100c.

In some example embodiments, the image generator 1214 may receive the image data of different exposure times from the camera modules 1100a, 1100b and 1100c. In this case, the image generator 1214 may perform high dynamic range (HDR) processing with respect to the image data from the camera modules 1100a, 1100b and 1100c to generate the output image having the increased dynamic range.

The camera module controller 1216 may provide control signals to the camera modules 1100a, 1100b and 1100c. The control signals generated by the camera module controller 1216 may be provided to the camera modules 1100a, 1100b and 1100c through the distinct control signal lines CSLa, CSLb and CSLc, respectively.

In some example embodiments, one of the camera modules 1100a, 1100b and 1100c may be designated as a master camera according to the image generating information of the mode signal, and the other camera modules may be designated as slave cameras.

The camera module acting as the master camera may be changed according to the zoom factor or an operation mode signal. For example, when the camera module 1100a (e.g., first camera module0 has the wider field of view than the camera module 1100b (e.g., second camera module) and the zoom factor indicates a lower zoom magnification, the camera module 1100b may be designated as the master camera. In contrast, when the zoom factor indicates a higher zoom magnification, the camera module 1100a may be designated as the master camera.

In some example embodiments, the control signals provided from the camera module controller 1216 may include a synch enable signal. For example, when the camera module 1100b is the master camera and the camera modules 1100a and 1100c are the slave cameras, the camera module controller 1216 may provide the synch enable signal to the camera module 1100b. The camera module 1100b may generate a synch signal based on the provided synch enable signal and provide the synch signal to the camera modules 1100a and 1100c through a synch signal line SSL. As such, the camera modules 1100a, 1100b and 1100c may transfer the synchronized image data to the application processor 1200 based on the synch signal.

In some example embodiments, the control signals provided from the camera module controller 1216 may include information on the operation mode. The camera modules 1100a, 1100b and 1100c may operate in a first operation mode or a second operation mode based on the information from the camera module controller 1216.

In the first operation mode, the camera modules 1100a, 1100b and 1100c may generate image signals with a first speed (e.g., a first frame rate) and encode the image signals with a second speed higher than the first speed (e.g., a second frame rate higher than the first frame rate) to transfer the encoded image signals to the application processor 1200. The second speed may be less than thirty times the first speed. The application processor 1200 may store the encoded image signals in the internal memory 1230 or the external memory 1400. The application processor 1200 may read out and decode the encoded image signals to provide display data to an display device. For example, the sub processors 1212a, 1212b and 1212c may perform the decoding operation and the image generator 1214 may process the decoded image signals.

In the second operation mode, the camera modules 1100a, 1100b and 1100c may generate image signals with a third speed lower than the first speed (e.g., the third frame rate lower than the first frame rate) to transfer the generated image signals to the application processor 1200. That is, the image signals that are not encoded may be provided to the application processor 1200. The application processor 1200 may process the received image signals or store the receive image signals in the internal memory 1230 or the external memory 1400.

The PMIC 1300 may provide a power supply voltage to the camera modules 1100a, 1100b and 1100c, respectively. For example, the PMIC 1300 may provide, under control of the application processor 1200, a first power to the camera module 1100a through a power line PSLa, a second power to the camera module 1100*b* through a power line PSLb, and a third power to the camera module 1100*c* through a power line PSLc.

The PMIC 1300 may generate the power respectively corresponding to the camera modules 1100*a*, 1100*b* and 1100*c* and control power levels, in response to a power control signal PCON from the application processor 1200. The power control signal PCON may include information on the power depending on the operation modes of the camera modules 1100*a*, 1100*b* and 1100*c*. For example, the operation modes may include a low power mode in which the camera modules 1100*a*, 1100*b* and 1100*c* operate with low powers. The power levels of the camera modules 1100*a*, 1100*b* and 1100*c* may be the same as or different from each other. In addition, the power levels may be changed dynamically or adaptively.

The inventive concept may be applied to any electronic devices and systems including a ToF sensor. For example, the inventive concept may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, a vehicle navigation device, a video phone, a monitoring system, an auto focusing system, a tracking system, a motion detection system, etc.

The foregoing is illustrative of example embodiments and is not to be construed as limiting thereof. Although a few example embodiments have been described, those skilled in the art will readily appreciate that many modifications are possible in the example embodiments without materially departing from the present inventive concept.

What is claimed is:

1. A method of operating a time-of-flight (ToF) sensor including at least one depth pixel having a multi-tap structure and a light source illuminating a transmission light to an object, the method comprising:
   determining an operation mode of the ToF sensor, from among a distance detection mode to sense a distance to an object and a plurality of additional operation modes;
   controlling a plurality of taps of a depth pixel, among the at least one depth pixel, and the light source based on the determined operation mode such that the plurality of taps generate a plurality of sample data corresponding to the determined operation mode; and
   determining a sensing result corresponding to the determined operation mode based on the plurality of sample data,
   wherein the controlling the plurality of taps and the light source comprises, based on the determined operation mode being one of the plurality of additional operation modes, dividing an integration period to collect a photo charge generated by an incident light into a plurality of shot periods.

2. The method of claim 1, wherein the plurality of additional operation modes includes an object detection mode to sense existence of the object, a motion detection mode to sense a motion of the object, a combination detection mode to simultaneously sense the existence of the object and the motion of the object, and a wide dynamic range (WDR) mode to sense the object with a plurality of sensing sensitivities.

3. The method of claim 1, wherein the controlling the plurality of taps and the light source further comprises:
   selectively activating the transmission light and a plurality of sampling control signals to control the plurality of taps during the plurality of shot periods based on the determined operation mode.

4. The method of claim 1, wherein at least one of a plurality of sampling control signals to control the plurality of taps is deactivated during the integration period to collect the photo charge generated by the incident light, to generate noise sample data indicating a sensing noise of the depth pixel.

5. The method of claim 1, wherein the controlling the plurality of taps and the light source further comprises:
   based on the determined operation mode being the distance detection mode, applying a plurality of sampling control signals of different phases to the plurality of taps during the integration period to collect the photo charge generated by the incident light; and
   based on the determined operation mode being one of the plurality of additional operation modes, selectively activating the plurality of sampling control signals during the plurality of shot periods based on the determined operation mode and applying the plurality of sampling control signals to the plurality of taps.

6. The method of claim 1, wherein the controlling the plurality of taps and the light source further comprises:
   based on the determined operation mode being the distance detection mode, controlling the light source to generate the transmission light modulated with a modulation frequency during an integration period to collect a photo charge generated by an incident light; and
   based on the determined operation mode being one of the plurality of additional operation modes, controlling the light source to generate the transmission light that is selectively activated during the plurality of shot periods based on the determined operation mode.

7. The method of claim 1, further comprising:
   changing the determined operation mode based on the sensing result.

8. The method of claim 1, wherein a number of the plurality of taps is greater than two.

9. The method of claim 1, wherein the controlling the plurality of taps and the light source further comprises, based on the determined operation mode being an object detection mode to sense existence of the object:
   dividing the integration period to collect the photo charge generated by the incident light into a first shot period and a second shot period;
   deactivating the transmission light during the first shot period;
   generating ambient light sample data corresponding to an ambient light by activating at least one first signal among a plurality of sampling control signals to control the plurality of taps during the first shot period;
   activating the transmission light during the second shot period; and
   generating object sample data corresponding to the object by activating at least one second signal among the plurality of sampling control signals during the second shot period.

10. The method of claim 9, wherein the determining the sensing result comprises, based on the determined operation mode being the object detection mode:
    determining whether the object exists within a reference distance based on a value of the object sample data subtracted by the ambient light sample data.

11. The method of claim 1, wherein the controlling the plurality of taps and the light source further comprises, based on the determined operation mode being a motion detection mode to sense a motion of the object:
- dividing the integration period to collect the photo charge generated by the incident light into a first shot period and a second shot period;
- generating first object sample data corresponding to the object by activating at least one first signal among a plurality of sampling control signals to control the plurality of taps during the first shot period; and
- generating second object sample data corresponding to the object by activating at least one second signal among the plurality of sampling control signals during the second shot period.

12. The method of claim 11, wherein the determining the sensing result comprises, based on the determined operation mode being the motion detection mode:
- determining the motion of the object based a difference value between the first object sample data and the second object sample data.

13. The method of claim 1, wherein the controlling the plurality of taps and the light source further comprises, based on the determined operation mode being a motion detection mode to sense a motion of the object:
- dividing the integration period to collect the photo charge generated by the incident light into the plurality of shot periods; and
- generating a plurality of object sample data corresponding to the object by sequentially activating a plurality of sampling control signals to control the plurality of taps during the plurality of shot periods.

14. The method of claim 1, wherein the controlling the plurality of taps and the light source comprises, based on the determined operation mode being a combination detection mode to sense both an existence of the object and a motion of the object:
- dividing the integration period to collect the photo charge generated by the incident light into a first shot period, a second shot period and a third shot period;
- deactivating the transmission light during the first shot period;
- generating ambient light sample data corresponding to an ambient light by activating at least one first signal among a plurality of sampling control signals to control the plurality of taps during the first shot period;
- activating the transmission light during the second shot period and the third shot period;
- generating first object sample data corresponding to the object by activating at least one second signal among the plurality of sampling control signals during the second shot period; and
- generating second object sample data corresponding to the object by activating at least one third signal among the plurality of sampling control signals during the third shot period.

15. The method of claim 14, wherein the determining the sensing result comprises, based on the determined operation mode being the combination detection mode:
- determining whether the object exists within a reference distance based on a value of the first object sample data subtracted by the ambient light sample data and the second object sample data subtracted by the ambient light sample data; and
- determining the motion of the object based a difference value between the first object sample data and the second object sample data.

16. The method of claim 1, wherein the controlling the plurality of taps and the light source further comprises, based on the determined operation mode being a WDR mode to sense the object with a plurality of sensing sensitivities:
- dividing the integration period to collect the photo charge generated by the incident light into a first shot period, a second shot period longer than the first shot period and a third shot period longer than the second shot period;
- generating first sensitivity sample data by activating at least one first signal among a plurality of sampling control signals to control the plurality of taps during the first shot period;
- generating second sensitivity sample data by activating at least one second signal among the plurality of sampling control signals during the second shot period; and
- generating third sensitivity sample data by activating at least one third signal among the plurality of sampling control signals during the third shot period.

17. A time-of-flight sensor comprising:
- a light source configured to illuminate a transmission light to an object;
- a pixel array comprising a depth pixel having a multi-tap structure;
- a row scanning circuit configured to generate a plurality of sampling control signals applied to a plurality of taps of the depth pixel; and
- a controller configured to control the light source, the pixel array and the row scanning circuit based on a mode signal indicating a selected operation mode of a ToF sensor, selected from among a distance detection mode to sense a distance to an object and a plurality of additional operation modes,
- wherein the row scanning circuit is further configured to, based on the selected operation mode being one of the plurality of additional operation modes, divide the integration period into a plurality of shot periods.

18. The ToF sensor of claim 17, wherein the row scanning circuit is further configured to:
- based on the selected operation mode being the distance detection mode, apply a plurality of sampling control signals of different phases to the plurality of taps during an integration period to collect a photo charge generated by an incident light; and
- based on the selected operation mode being one of the plurality of additional operation modes, selectively activate the plurality of sampling control signals during the plurality of shot periods based on the selected operation mode and apply the plurality of sampling control signals to the plurality of taps.

19. The ToF sensor of claim 17, wherein the light source is further configured to:
- based on the selected operation mode being the distance detection mode, generate the transmission light modulated with a modulation frequency during an integration period to collect a photo charge generated by an incident light; and
- based on the selected operation mode being one of the plurality of additional operation modes, divide the integration period into the plurality of shot periods and generate the transmission light that is selectively activated during the plurality of shot periods based on the selected operation mode.

20. A method of operating a time-of-flight (ToF) sensor including at least one depth pixel having a multi-tap structure and a light source illuminating a transmission light to an object, the method comprising:

determining an operation mode of a ToF sensor, from among a distance detection mode to sense a distance to an object and a plurality of additional operation modes;

based on the determined operation mode being the distance detection mode, applying a plurality of sampling control signals of different phases to a plurality of taps of a depth pixel during an integration period to collect a photo charge generated by an incident light; and based on the determined operation mode being one of the plurality of additional operation modes, dividing the integration period into a plurality of shot periods and selectively activating the transmission light and the plurality of sampling control signals during the plurality of shot periods based on the determined operation mode.

* * * * *